United States Patent
Tanaka

(10) Patent No.: US 12,480,969 B2
(45) Date of Patent: Nov. 25, 2025

(54) PHYSICAL QUANTITY SENSOR AND INERTIAL MEASUREMENT UNIT

(71) Applicant: SEIKO EPSON CORPORATION, Tokyo (JP)

(72) Inventor: Satoru Tanaka, Chino (JP)

(73) Assignee: SEIKO EPSON CORPORATION (JP)

( * ) Notice: Subject to any disclaimer, the term of this patent is extended or adjusted under 35 U.S.C. 154(b) by 289 days.

(21) Appl. No.: 18/343,075

(22) Filed: Jun. 28, 2023

(65) Prior Publication Data
US 2024/0003936 A1 Jan. 4, 2024

(30) Foreign Application Priority Data
Jun. 29, 2022 (JP) ................. 2022-104368

(51) Int. Cl.
*G01P 15/135* (2006.01)
*G01P 15/125* (2006.01)

(52) U.S. Cl.
CPC .......... *G01P 15/135* (2013.01); *G01P 15/125* (2013.01)

(58) Field of Classification Search
CPC ...... G01P 15/135; G01P 15/125; G01P 15/18; G01P 2015/0831; G01P 15/08; G01P 2015/0862
See application file for complete search history.

(56) References Cited

U.S. PATENT DOCUMENTS

| | | | | |
|---|---|---|---|---|
| 6,000,280 A * | 12/1999 | Miller | ...................... | G01B 5/28 977/872 |
| 8,187,902 B2 * | 5/2012 | Weinberg | ........... | G01C 19/5719 73/504.12 |
| 12,007,554 B2 * | 6/2024 | Jin | ..................... | G02B 26/0841 |
| 2010/0213791 A1 * | 8/2010 | Kandori | ............. | G01C 19/5719 310/309 |
| 2021/0065990 A1 | 3/2021 | Fujimoto et al. | | |

FOREIGN PATENT DOCUMENTS

JP 2021-032819 A 3/2021

* cited by examiner

*Primary Examiner* — Xin Y Zhong
(74) *Attorney, Agent, or Firm* — Harness, Dickey & Pierce, P.L.C.

(57) ABSTRACT

A physical quantity sensor includes a fixed portion, a support beam, a movable body, and a first fixed electrode group. The movable body is coupled to the other end of the support beam, and the first fixed electrode group is provided at a substrate and arranged in a first direction of the support beam. The movable body includes a first coupling portion, a first base portion, and a first movable electrode group. The first movable electrode group faces the first fixed electrode group in a second direction. Further, hm=hr, where hm is a height of a gravity center position of the movable body in a third direction and hr is a height of a rotation center of the support beam in the third direction.

8 Claims, 20 Drawing Sheets

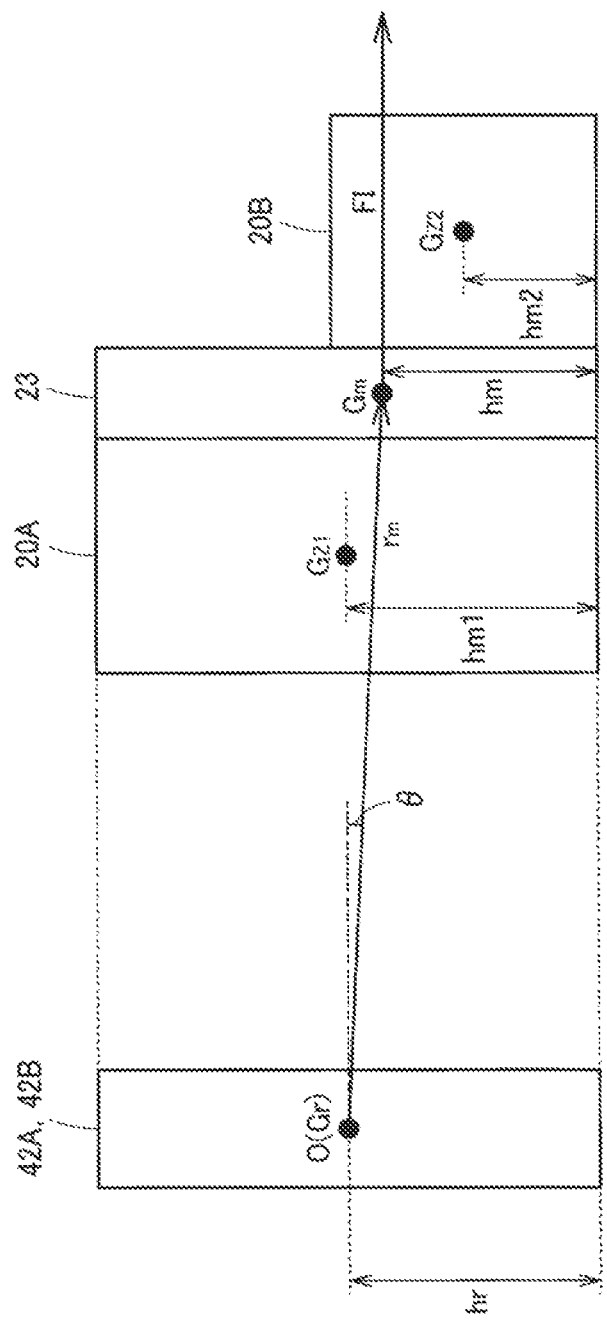
FIG. 6
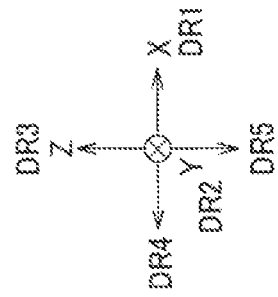

FIG. 8
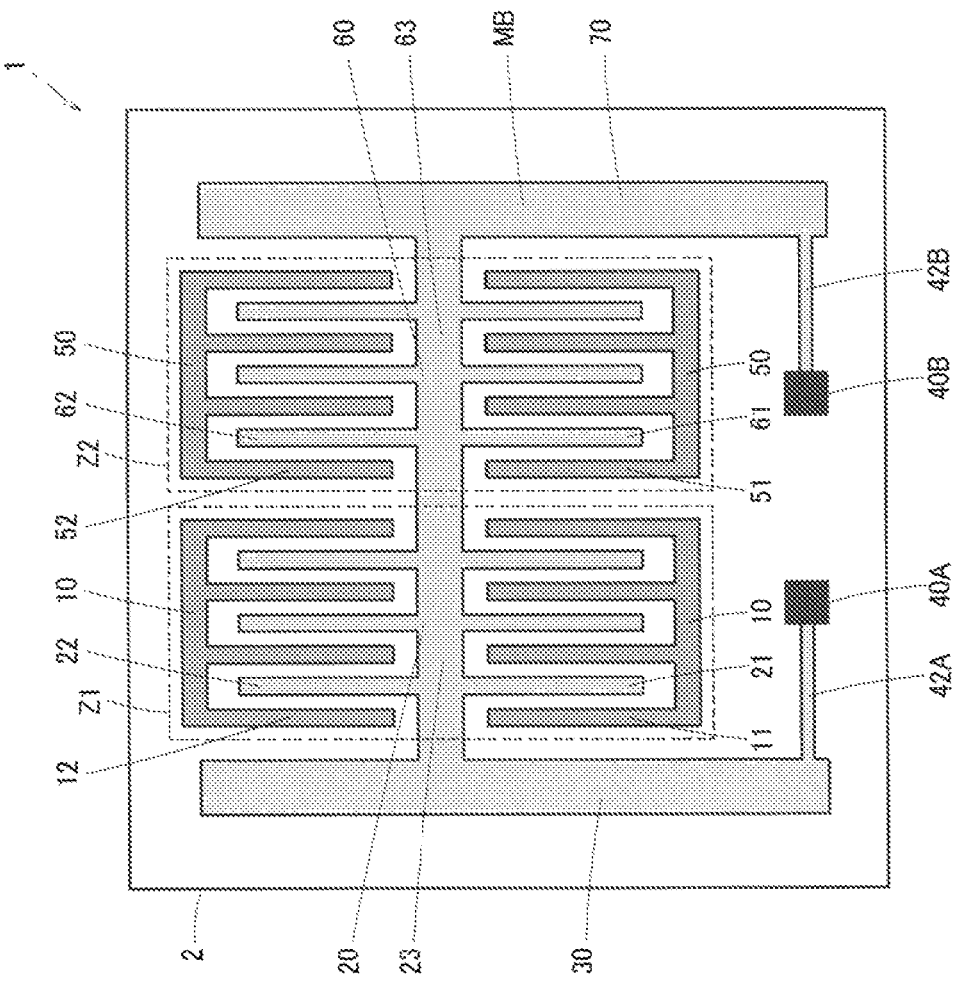
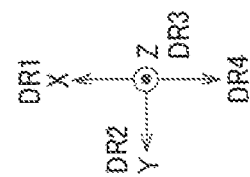

FIG. 9
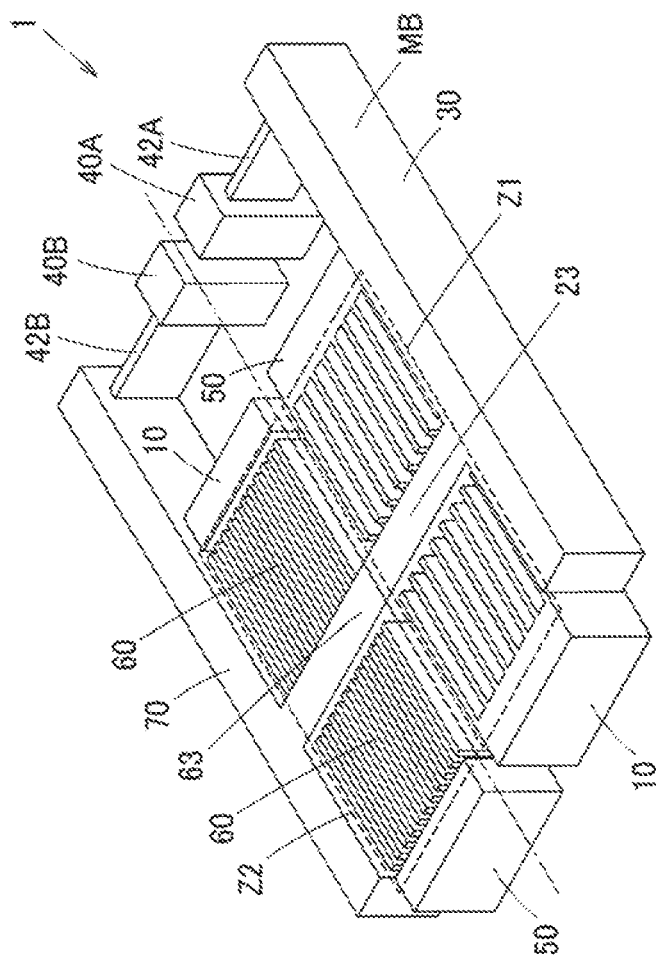
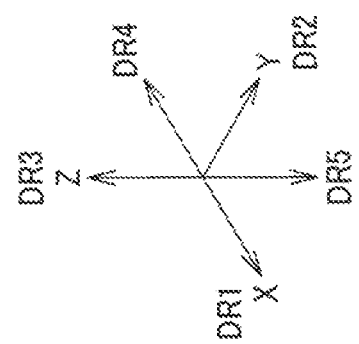

FIG. 10
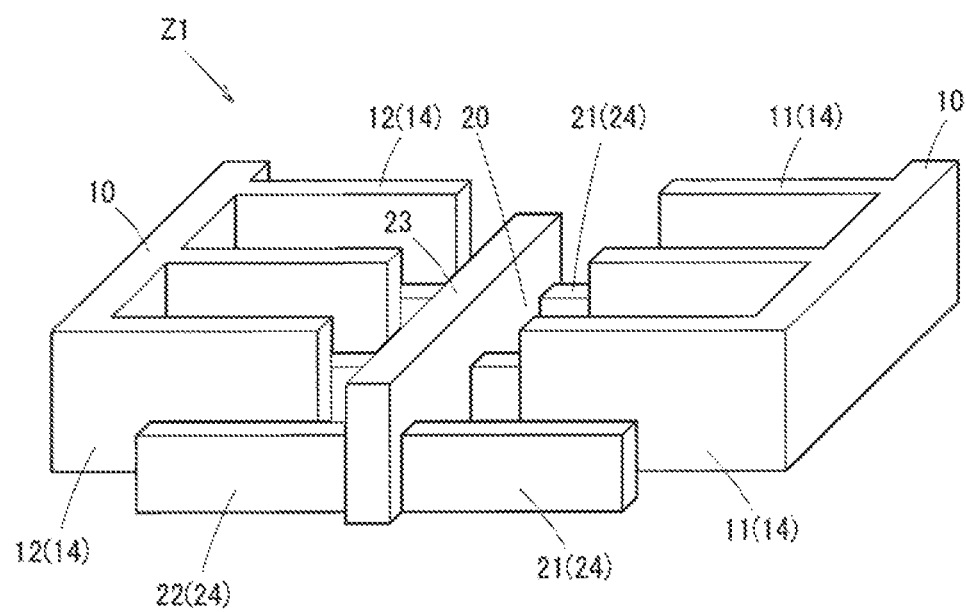
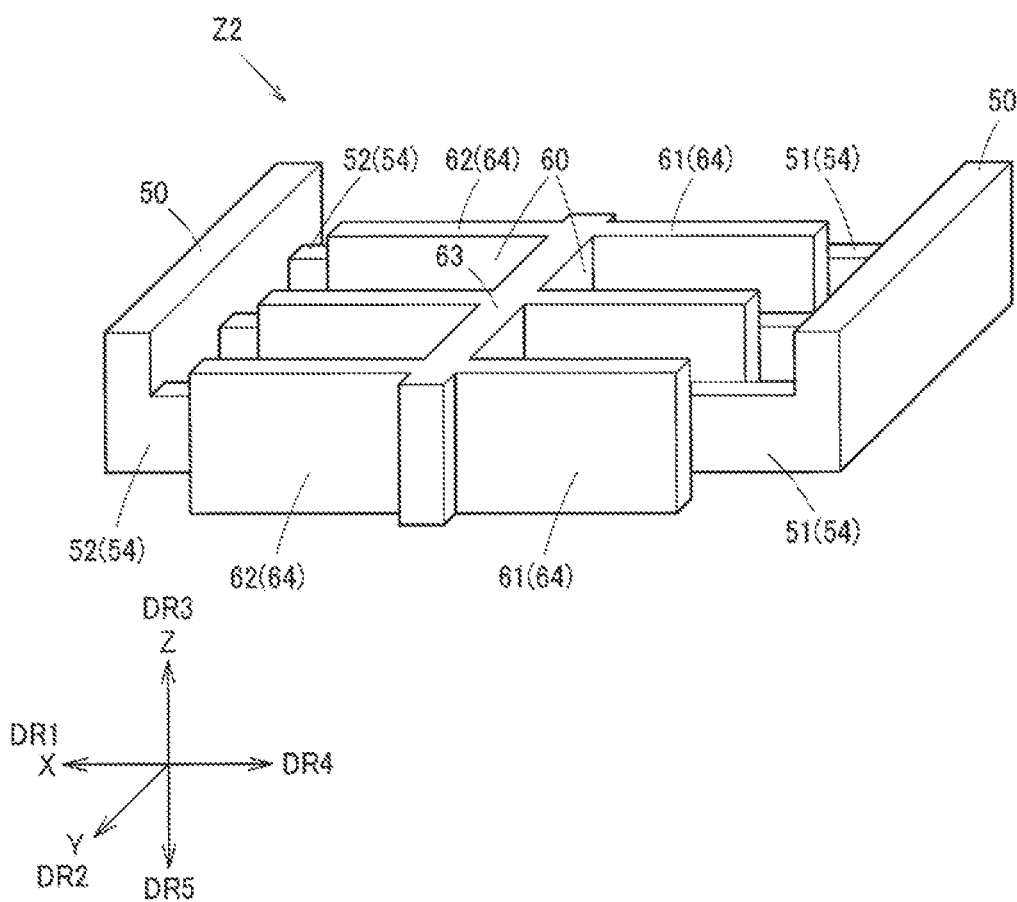

PHYSICAL QUANTITY SENSOR AND INERTIAL MEASUREMENT UNIT

The present application is based on, and claims priority from JP Application Serial Number 2022-104368, filed Jun. 29, 2022, the disclosure of which is hereby incorporated by reference herein in its entirety.

BACKGROUND

1. Technical Field

The present disclosure relates to a physical quantity sensor, an inertial measurement unit, and the like.

2. Related Art

JP-A-2021-032819 discloses a physical quantity sensor that detects an acceleration in a Z direction. It is disclosed that, in the physical quantity sensor, a length of one of a plurality of first electrodes along a first direction is smaller than a length of a first conductive portion along the first direction of the first conductive portion. Further, it is disclosed that, in the physical quantity sensor, a length of one of a plurality of second electrodes along the first direction is smaller than a length of a second conductive portion along the first direction of the second conductive portion.

In the physical quantity sensor disclosed in JP-A-2021-032819, when an acceleration is applied in a comb tooth electrode length direction that is not a Z-axis direction that is a detection target direction, there are problems that the same seesaw operation as that performed when an acceleration is applied in the detection axis direction is performed, and sensitivity in other axial direction increases.

SUMMARY

An aspect of the present disclosure relates to a physical quantity sensor that, when three directions orthogonal to one another are defined as a first direction, a second direction, and a third direction, detects a physical quantity in the third direction, the physical quantity sensor including: a fixed portion fixed to a substrate; a support beam having one end coupled to the fixed portion and being provided along the second direction; a movable body coupled to the other end of the support beam; and a first fixed electrode group provided at the substrate and arranged in the first direction of the support beam. The movable body includes a first coupling portion coupled to the other end of the support beam and extending from the support beam in the first direction, a first base portion coupled to the first coupling portion and provided along the second direction, and a first movable electrode group provided at the first base portion and facing the first fixed electrode group in the second direction. Further, hm=hr, where hm is a height of a gravity center position of the movable body in the third direction and hr is a height of a rotation center of the support beam in the third direction.

Another aspect of the present disclosure relates to an inertial measurement unit including the physical quantity sensor described above and a control unit configured to perform control based on a detection signal output from the physical quantity sensor.

BRIEF DESCRIPTION OF THE DRAWINGS

FIG. 6 is a schematic cross-sectional view illustrating a relationship between a gravity center and an inertial force, of a movable body, when the embodiment is not applied.

FIG. 8 is a plan view of a first detailed example of the embodiment.

FIG. 9 is a perspective view of a first detailed example of the embodiment.

FIG. 10 is a perspective view of a detection part in the first detailed example of the embodiment.

DESCRIPTION OF EXEMPLARY EMBODIMENTS

Hereinafter, an embodiment will be described. The embodiment to be described below does not unduly limit contents described in the claims. All configurations described in the embodiment are not necessarily essential constituent elements.

1. Physical Quantity Sensor

Figure 1:
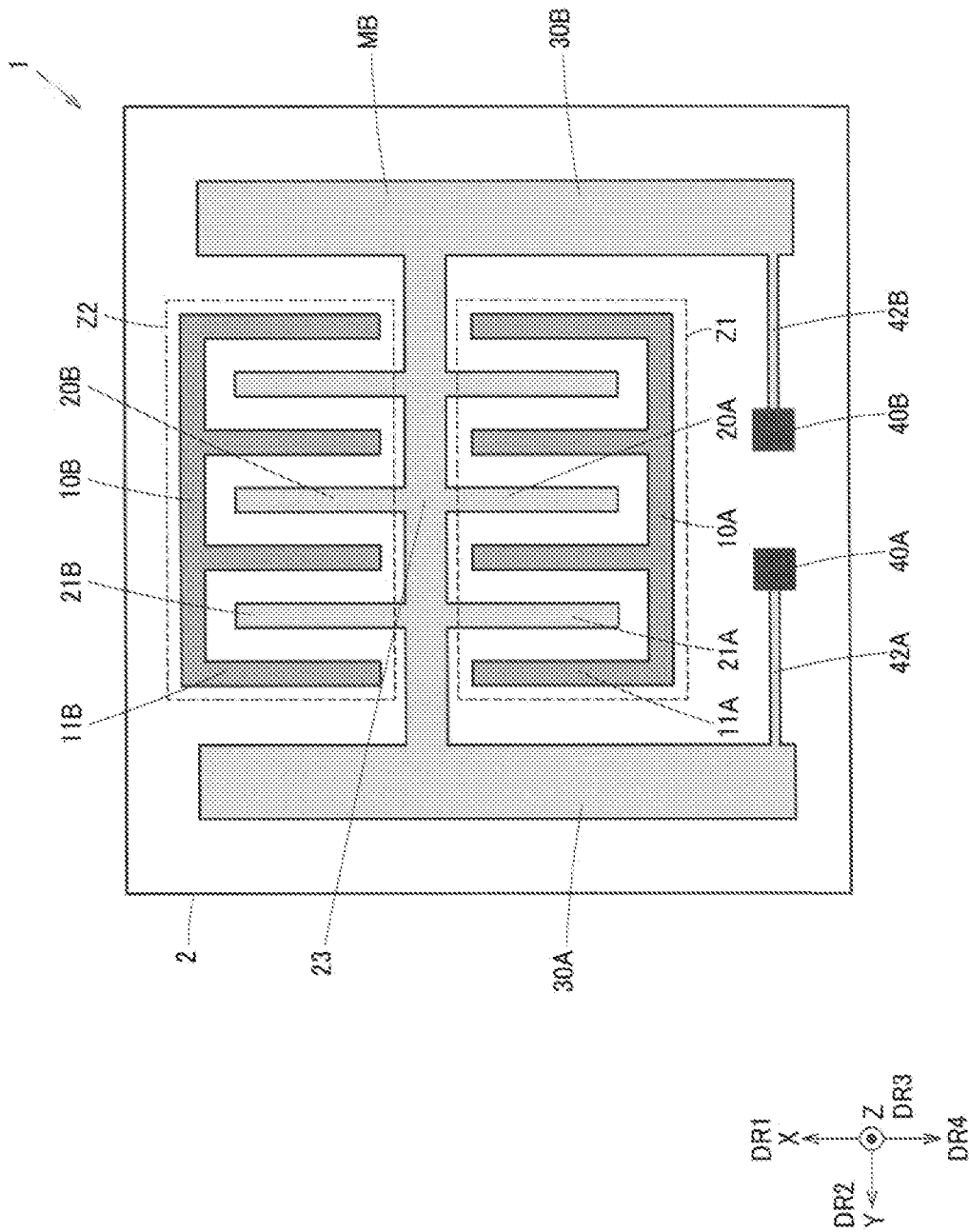
FIG. 1 is a configuration example of a physical quantity sensor according to an embodiment.

A physical quantity sensor 1 of the embodiment will be described using an acceleration sensor, which detects an acceleration in a vertical direction, as an example. FIG. 1 is a plan view of the physical quantity sensor 1 of the embodiment in a plan view in a direction orthogonal to a substrate 2. The physical quantity sensor 1 is a micro electro mechanical system (MEMS) device, and is, for example, an inertial sensor.

In FIG. 1 and FIGS. 2 to 18 to be described later, for convenience of description, dimensions of respective members, intervals between the members, and the like are schematically illustrated, and not all the components are illustrated. For example, an electrode wiring, an electrode terminal, and the like are not illustrated. In the following description, a case where a physical quantity detected by the physical quantity sensor 1 is an acceleration will be mainly described as an example. The physical quantity is not limited to the acceleration, and may be another physical quantity such as a velocity, pressure, displacement, a posture, an angular velocity, or gravity, and the physical quantity sensor 1 may be used as a pressure sensor, a MEMS switch, or the like. In FIG. 1, directions orthogonal to one another are defined as a first direction DR1, a second direction DR2, and a third direction DR3. The first direction DR1, the second direction DR2, and the third direction DR3 are, for example, an X-axis direction, a Y-axis direction, and a Z-axis direction, respectively, and are not limited thereto. For example, the third direction DR3 corresponding to the Z-axis direction is, for example, a direction orthogonal to the substrate 2 of the physical quantity sensor 1, and is, for example, the vertical direction. A direction opposite to the third direction DR3 is defined as a fifth direction DR5. The first direction DR1 corresponding to the X-axis direction and the second direction DR2 corresponding to the Y-axis direction are directions orthogonal to the third direction DR3, and an XY plane that is a plane along the first direction DR1 and the second direction DR2 is, for example, along a horizontal plane. A direction opposite to the first direction DR1 is defined as a fourth direction DR4, and the fourth direction is, for example, a −X-axis direction. The term "orthogonal" includes not only a case of intersecting at 90° but also a case of intersecting at an angle slightly inclined from 90°.

The substrate 2 is, for example, a silicon substrate made of semiconductor silicon or a glass substrate made of a glass material such as borosilicate glass. However, a constituent material of the substrate 2 is not particularly limited, and a quartz substrate, a silicon on insulator (SOI) substrate, or the like may be used.

As illustrated in FIG. 1, the physical quantity sensor 1 of the embodiment includes fixed portions 40A and 40B, support beams 42A and 42B, a movable body MB, and first fixed electrode groups 10A and 10B. The movable body MB includes first coupling portions 30A and 30B, a first base portion 23, and first movable electrode groups 20A and 20B. The first fixed electrode group 10A includes a plurality of first fixed electrodes 11A, and the first fixed electrode group 10B includes a plurality of first fixed electrodes 11B. The first movable electrode group 20A includes a plurality of first movable electrodes 21A, and the first movable electrode group 20B includes a plurality of first movable electrodes 21B.

As indicated by a broken line frame in FIG. 1, the physical quantity sensor 1 includes a detection part Z1 and a detection part Z2, and each detection part detects a physical quantity such as an acceleration in a direction along the third direction DR3 that is the Z-axis direction. The detection parts Z1 and Z2 are provided at a first direction DR1 side and a fourth direction DR4 side of the first base portion 23, respectively, in a plan view. The detection part Z1 provided at the fourth direction DR4 side of the first base portion 23 includes the first fixed electrode group 10A and the first movable electrode group 20A. The detection part Z2 provided at the first direction DR1 side of the first base portion 23 includes the first fixed electrode group 10B and the first movable electrode group 20B.

Figure 2:
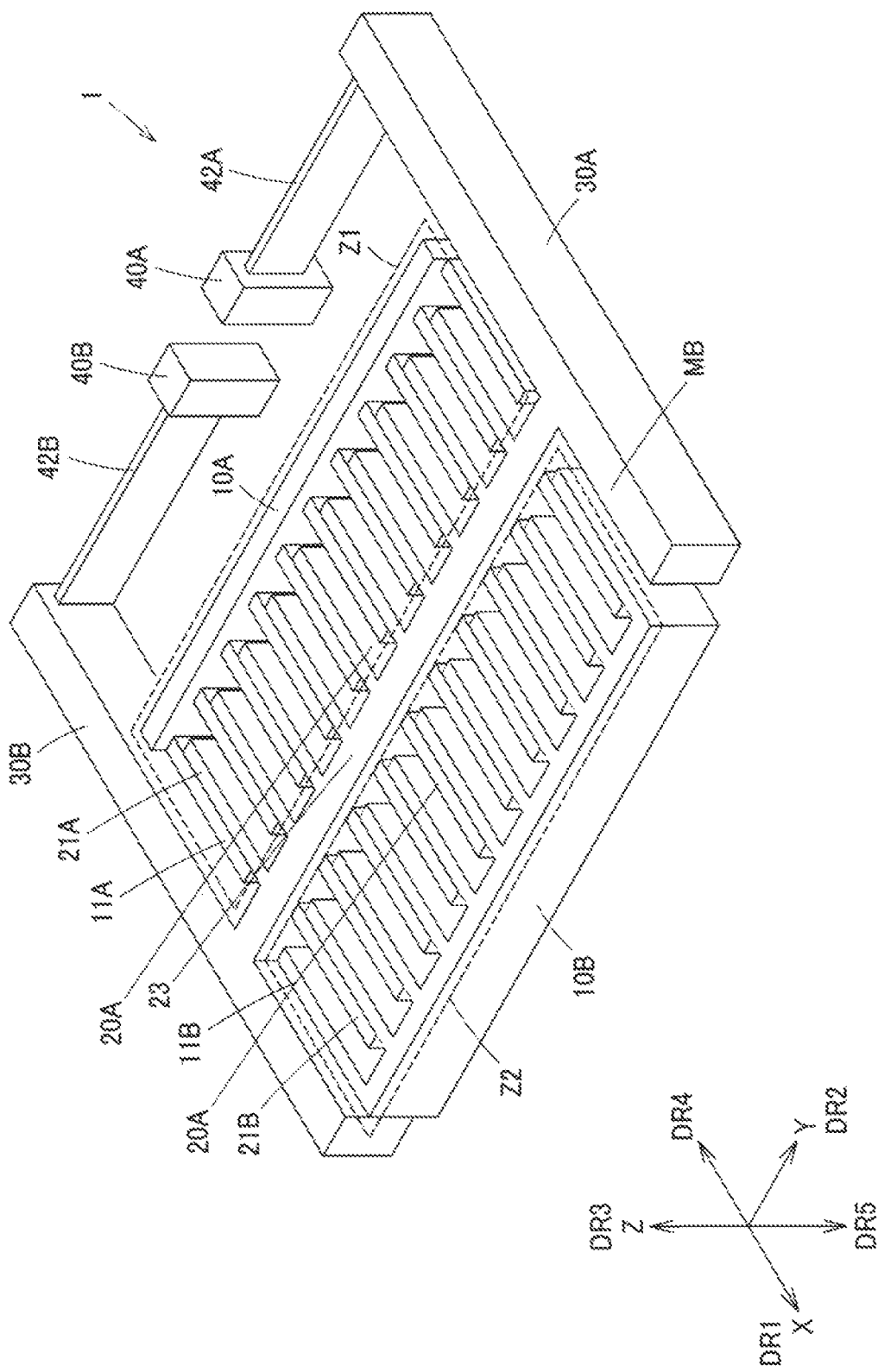
FIG. 2 is a perspective view of the physical quantity sensor according to the embodiment.

FIG. 2 is a perspective view of the physical quantity sensor 1 of the embodiment. The fixed portions 40A and 40B are provided at the substrate 2 as illustrated in FIG. 2. The fixed portion 40A fixes one end of the support beam 42A to the substrate 2 and is coupled to the first coupling portion 30A of the movable body MB. The fixed portion 40B is coupled to one end of the support beam 42B and is coupled to the first coupling portion 30B of the movable body MB. In this way, the fixed portions 40A and 40B couple the movable body MB to the substrate 2 via the support beams 42A and 42B. The fixed portions 40A and 40B serve as anchors for a seesaw movement of the movable body MB to be described later with reference to FIG. 4.

The support beams 42A and 42B apply a restoring force in the seesaw movement of the movable body MB. As illustrated in FIG. 2, the one ends of the support beams 42A and 42B are coupled to parts of the fixed portions 40A and 40B, respectively. The other ends of the support beams 42A and 42B are coupled to the first coupling portions 30A and 30B, respectively. In this way, the support beams 42A and 42B couple the fixed portions 40A and 40B to the movable body MB. The support beams 42A and 42B are, for example, torsion springs. As illustrated in FIG. 1, the support beams 42A and 42B are provided such that, for example, the second direction DR2 is a longitudinal direction thereof in the plan view. The support beams 42A and 42B have a small thickness in the first direction DR1, and are bent in response to the movement of the movable body MB. Then, the movable body MB is twisted, for example, on the Y axis that is the second direction DR2, thereby generating a restoring force in the seesaw movement of the movable body MB. As described above, in the embodiment, the support beams 42A and 42B are torsion springs twisted with the second direction DR2 as a rotation axis. In this way, the movable body MB can perform the swing movement with the second direction DR2 as a rotation axis.

The movable body MB swings, for example, around the rotation axis extending along the second direction DR2. That is, the movable body MB performs the seesaw movement by using torsion of the support beams 42A and 42B described above as a restoring force in a rotational movement around the second direction DR2. A physical quantity is detected using the first movable electrode groups 20A and 20B of the movable body MB as probe electrodes.

The first coupling portion 30A couples the first base portion 23 to the other end of the support beam 42A that is not coupled to the fixed portion 40A. The first coupling portion 30B couples the first base portion 23 to the other end of the support beam 42B that is not coupled to the fixed portion 40B. In this way, the first coupling portions 30A and 30B couple the first movable electrode groups 20A and 20B of the movable body MB so as to be positioned at a fixed distance from the rotation axis of the seesaw movement.

The first base portion 23 is a base portion that couples the first coupling portion 30A and the first coupling portion 30B and supports the first movable electrode groups 20A and 20B provided at the movable body MB. Specifically, the first base portion 23 is coupled to the fixed portions 40A and 40B, and couples the first coupling portions 30A and 30B to each other so that the movable body can perform seesaw movement integrally. The first movable electrode group 20A includes the plurality of first movable electrodes 21A extending from the first base portion 23 toward the fourth direction DR4 side, and the first movable electrode group 20B includes the plurality of first movable electrodes 21B extending from the first base portion 23 toward the first direction DR1 side.

The first movable electrode groups 20A and 20B and the first fixed electrode groups 10A and 10B are probes that detect a physical quantity. As described above, the first movable electrode groups 20A and 20B are provided at the fourth direction DR4 side and the first direction DR1 side of the first base portion 23, respectively. The first fixed electrode groups 10A and 10B are fixed to the substrate 2 by a fixing portion. In the first fixed electrode groups 10A and 10B, the plurality of first fixed electrodes 11A and 11B are provided to extend, for example, along the first direction DR1. Each of the first fixed electrodes 11A and 11B forms an electrode group arranged in a comb shape. The number of the first fixed electrodes 11A and 11B is not limited to four as shown in FIG. 1, and can be freely set. Similarly, the number of the first movable electrodes 21A and 21B may be freely set.

As illustrated in FIG. 1, the first movable electrode 21A of the first movable electrode group 20A faces the first fixed electrode 11A of the first fixed electrode group 10A in the second direction DR2. Similarly, the first movable electrode 21B of the first movable electrode group 20B faces the first fixed electrode 11B of the first fixed electrode group 10B in the second direction DR2. A portion where the first movable electrode 21A and the first fixed electrode 11A face each other in this manner is the detection part Z1. In addition, a portion where the first movable electrode 21B and the first fixed electrode 11B face each other is the detection part Z2.

Figure 3:
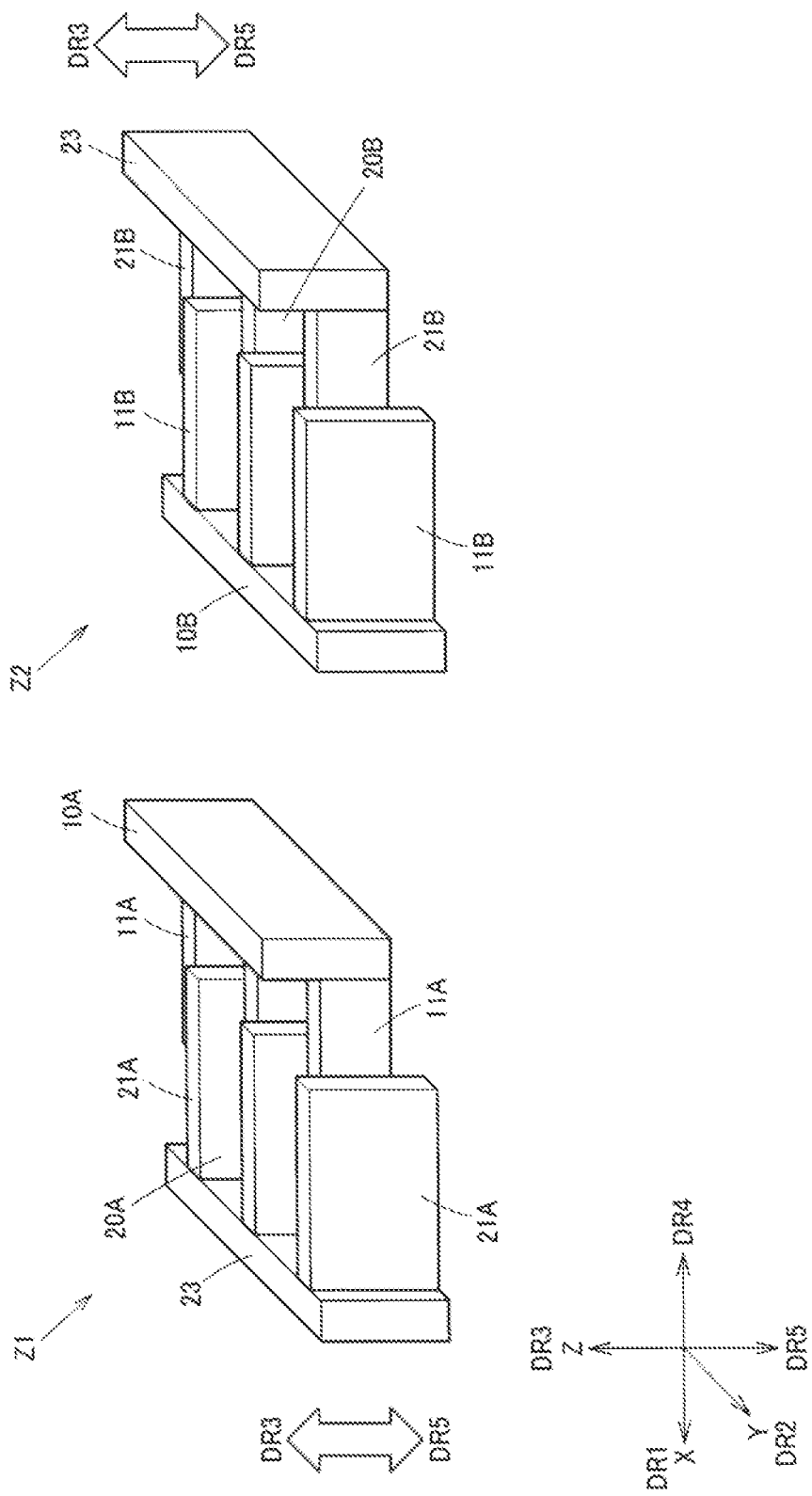
FIG. 3 is a perspective view of a detection part.

FIG. 3 is a perspective view illustrating structures of the electrodes of the detection parts Z1 and Z2 of the embodiment. As illustrated in FIG. 3, in the detection part Z1, the first fixed electrode 11A and the first movable electrode 21A have different thicknesses in the third direction DR3. In the detection part Z2, the first fixed electrode 11B and the first movable electrode 21B have different thicknesses in the third direction DR3. Specifically, in the detection part Z1, the thickness of the first movable electrode 21A in the third direction DR3 is larger than the thickness of the first fixed electrode 11A in the third direction DR3. On the other hand, in the detection part Z2, the thickness of the first movable electrode 21B in the third direction DR3 is smaller than the thickness of the first fixed electrode 11B in the third direction DR3. The first fixed electrode 11A of the detection part Z1 is equal to the first movable electrode 21B of the detection part Z2 in the thickness in the third direction DR3. The first movable electrode 21A of the detection part Z1 and the first fixed electrode 11B of the detection part Z2 are equal to the first base portion 23 in the thickness in the third direction DR3. Here, the thickness is not limited to, for example, a physical thickness of an element obtained by measuring a cross section thereof using a scanning electron microscope (SEM) or the like, and includes a film thickness estimated based on optical characteristics such as a refractive index of a thin film.

Figure 4:
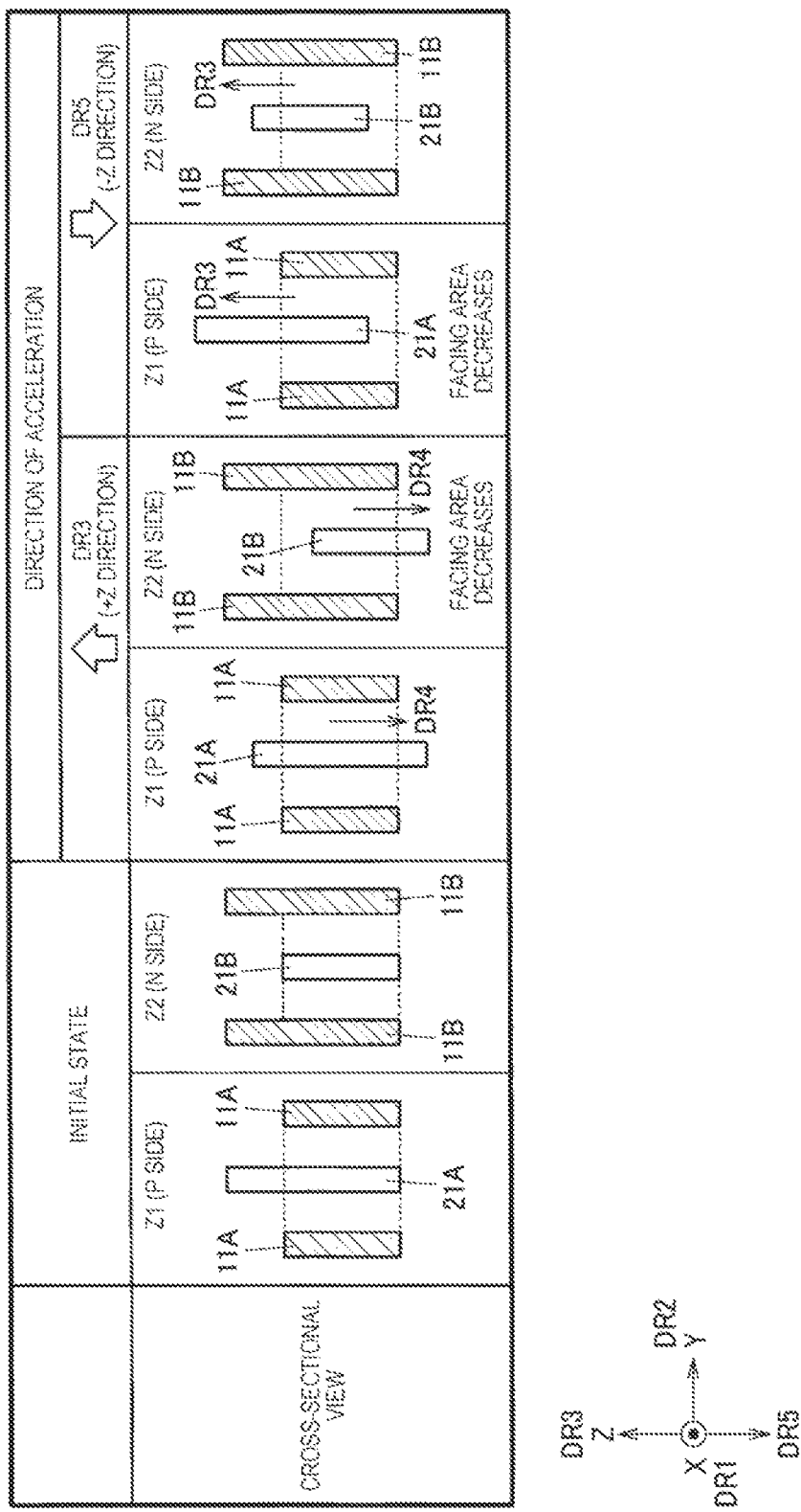
FIG. 4 is a diagram illustrating an operation of the detection part.

FIG. 4 is a diagram illustrating operations of the detection parts Z1 and Z2 of the physical quantity sensor 1 of the embodiment. Specifically, movement of the probe electrodes performed with respect to a direction of an acceleration when the acceleration occurs from an initial state is shown in a schematic view of a cross section as viewed from the first direction DR1. Here, the initial state refers to a stationary state, that is, a state in which no acceleration occurs except for the gravitational acceleration. The detection part Z1 corresponds to a P side of a probe, and the detection part Z2 corresponds to an N side of the probe.

First, in the initial state illustrated in a left part of FIG. 4, the first fixed electrode 11A and the first movable electrode 21A of the detection part Z1 face each other so that parts thereof overlap each other along the third direction DR3. Specifically, positions of ends of the first fixed electrode 11A and the first movable electrode 21A in the fifth direction DR5 coincide with each other, but a position of an end of the first movable electrode 21A in the third direction DR3 is at a third direction DR3 side with respect to a position of an end of the first fixed electrode 11A in the third direction DR3. In the initial state, the first fixed electrode 11A and the first movable electrode 24 are stationary in a state of partially overlapping each other along the third direction DR3. The first fixed electrode 11B and the first movable electrode 21B of the detection part Z2 also face each other so that parts thereof overlap each other along the third direction DR3. In the detection part Z2, an end of the first fixed electrode 11B in the third direction DR3 is positioned at the third direction DR3 side with respect to an end of the first movable electrode 21B in the third direction DR3.

In this initial state, a physical quantity obtained by summing a physical quantity corresponding to a facing area of the first fixed electrode 11A and the first movable electrode 21A in the detection part Z1 and a physical quantity corresponding to a facing area of the first fixed electrode 11B and the first movable electrode 21B in the detection part Z2 is a physical quantity in the initial state. Examples of the physical quantity include a static capacitance.

Next, a state in which an acceleration in the third direction DR3 occurs as illustrated in a center part of FIG. 4 will be described. In the state where the acceleration in the third direction DR3 occurs, the first movable electrodes 21A and 21B in the detection parts Z1 and Z2 receive an inertial force in a direction opposite to the direction of the acceleration. Therefore, the first movable electrode 21A of the detection part Z1 is displaced to a fifth direction DR5 side, and the first movable electrode 21B of the detection part Z2 is also displaced to the fifth direction DR5 side. Accordingly, in the detection part Z1, the facing area of the first fixed electrode 11A and the first movable electrode 21A is maintained as illustrated in FIG. 4, and in the detection part Z2, the facing area of the first fixed electrode 11B and the first movable electrode 21B decreases. Accordingly, a physical quantity in the third direction DR3 can be detected by detecting a change in a physical quantity due to a decrease in the facing area in the detection part Z2.

On the other hand, as illustrated in a right part of FIG. 4, in a state where an acceleration in the fifth direction DR5 occurs from the initial state, the first movable electrodes 21A and 21B receive an inertial force in a +Z direction in the detection parts Z1 and Z2. Therefore, in the detection part Z1, the first movable electrode 21A is displaced to the third direction DR3 side, that is, the +Z direction, and the first movable electrode 21B of the detection part Z2 is also displaced in the +Z direction. Accordingly, in the detection part Z1, the facing area of the first fixed electrode 11A and the first movable electrode 21A decreases, and in the detection part Z2, the facing area of the first fixed electrode 11B and the first movable electrode 21B is maintained. Accordingly, a physical quantity in the fifth direction DR5 can be detected by detecting a change in a physical quantity due to a decrease in the facing area in the detection part Z1. When detecting a change in the static capacitance serving as a physical quantity, for example, the static capacitance can be detected by coupling the first fixed electrodes 11A and 11B and the first movable electrodes 21A and 21B to a differential amplifier circuit (not shown) via a wiring and a pad.

Figure 5:
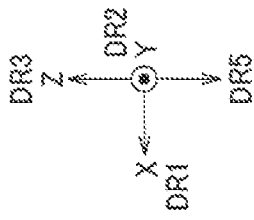
FIG. 5 is a diagram illustrating a positional relationship between centers of gravity of components in the embodiment.

FIG. 5 is a schematic cross-sectional view of the first movable electrode groups 20A and 20B, the first base portion 23, the first coupling portions 30A and 30B, and the support beams 42A and 42B of the embodiment as viewed from the second direction DR2. Since FIG. 5 focuses on the difference in thickness in the third direction DR3 of the components, the components are not described with an accurate dimension.

In the embodiment, the first movable electrode group 20A of the detection part Z1, the first base portion 23, and the first coupling portions 30A and 30B have the largest thickness in the third direction DR3. The thickness in the third direction DR3 decreases in the order of the support beams 42A and 42B and the first movable electrode group 20B.

In FIG. 5, a black circle marked in each component indicates a gravity center position of the component. Here, a gravity center position of the first movable electrode group 20A is denoted by $G_{Z1}$, a gravity center position of the first movable electrode group 20B is denoted by $G_{Z2}$, a gravity center position of the movable body MB is denoted by Gm, and a gravity center position of the support beams 42A and 42B is denoted by Gr. For example, in the first movable electrode group 20A displayed at a left part of FIG. 5, the gravity center position $G_{Z1}$ of the plurality of first movable electrodes 21A included in the first movable electrode group 20A is positioned at a center position thereof in the third direction DR3 when the entire first movable electrode group 20A is viewed. The first movable electrode 21B of the first movable electrode group 20B has a smaller thickness in the third direction DR3 than the first movable electrode 21A as described with reference to FIG. 3, and thus the gravity center position $G_{Z2}$ at a center position of the first movable electrode 21B is also positioned at the fifth direction DR side, that is, at a −Z direction side with respect to the gravity center position $G_{Z1}$ of the first movable electrode group 20A.

Here, the gravity center refers to a center position of mass distribution in a target component. Therefore, when there is no uniformity in the mass distribution in the target component, it may not necessarily be the case where the gravity center position is a center position of the component in the third direction DR3 as described above.

In FIG. 5, the gravity center position Gm is illustrated in the third movable body MB in a third column from the left. The gravity center position Gm of the movable body MB indicates a gravity center position in a case where the movable body MB is viewed as a member in which a plurality of components, that is, the first movable electrode groups 20A and 20B, the first base portion 23, and the first coupling portions 30A and 30B are integrated. As described above, the gravity center position $G_{Z1}$ of the first movable electrode group 20A and the gravity center position $G_{Z2}$ of the first movable electrode group 20B are shifted from each other in the third direction DR3, and thus the gravity center position Gm of the movable body MB including the first movable electrode group 20A and the first movable electrode group 20B is positioned between the gravity center position $G_{Z1}$ and the gravity center position $G_{Z2}$. Since the movable body MB is an aggregate of a plurality of components, only the gravity center position thereof is shown in FIG. 5. The gravity center position Gm of the movable body MB and the gravity center position Gr of the support beams 42A and 42B coincide with each other in the third direction DR3. That is, in the embodiment, a positional relationship in the third direction DR3 between the gravity center position $G_{Z1}$ of the first movable electrode group 20A, the gravity center position $G_{Z2}$ of the first movable electrode group 20B, the gravity center position Gm of the movable body MB, and the gravity center position Gr of the support beams 42A and 42B is $G_{Z1} > Gm = Gr > G_{Z2}$. As described above, in the embodiment, the thicknesses of the first movable electrode group 20B and the support beams 42A and 42B in the third direction DR3 are designed such that the positional relationship in the third direction DR3 between the gravity center positions of the components is $G_{Z1} > Gm = Gr > G_{Z2}$.

Since the gravity center described above refers to the center position of mass distribution in the target component, when mass distribution in the components is not uniform, gravity center positions are not necessarily center positions of the components. Accordingly, regardless of the thicknesses in the third direction DR3, shapes, or the like of the components, the gravity center position Gm of the movable body MB and the gravity center position Gr of the support beams 42A and 42B may coincide with each other in the third direction DR3. In the embodiment, even if the thicknesses and shapes of the components do not have a magnitude relationship illustrated in FIG. 5, it is sufficient that the gravity center position Gm of the movable body MB and the gravity center position Gr of the support beams 42A and 42B coincide with each other in the third direction DR3.

In addition, the positions in the third direction DR3 coinciding with each other as described above means that the positions substantially coincide with each other. For example, in a case of performing etching in a semiconductor manufacturing process, even when etching is performed with the same apparatus and conditions, variations in finished dimensions occur due to the apparatus. Therefore, it is a common practice to perform process management by providing a fixed margin for a target machining dimension. For this reason, the gravity center position Gm of the movable body MB and the gravity center position Gr of the support beams 42A and 42B usually do not completely coincide with each other in the third direction DR3. Accordingly, the positions in the third direction DR3 coinciding with each other as described above includes the case where the positions in the third direction DR3 substantially coincide with each other.

Figure 7:
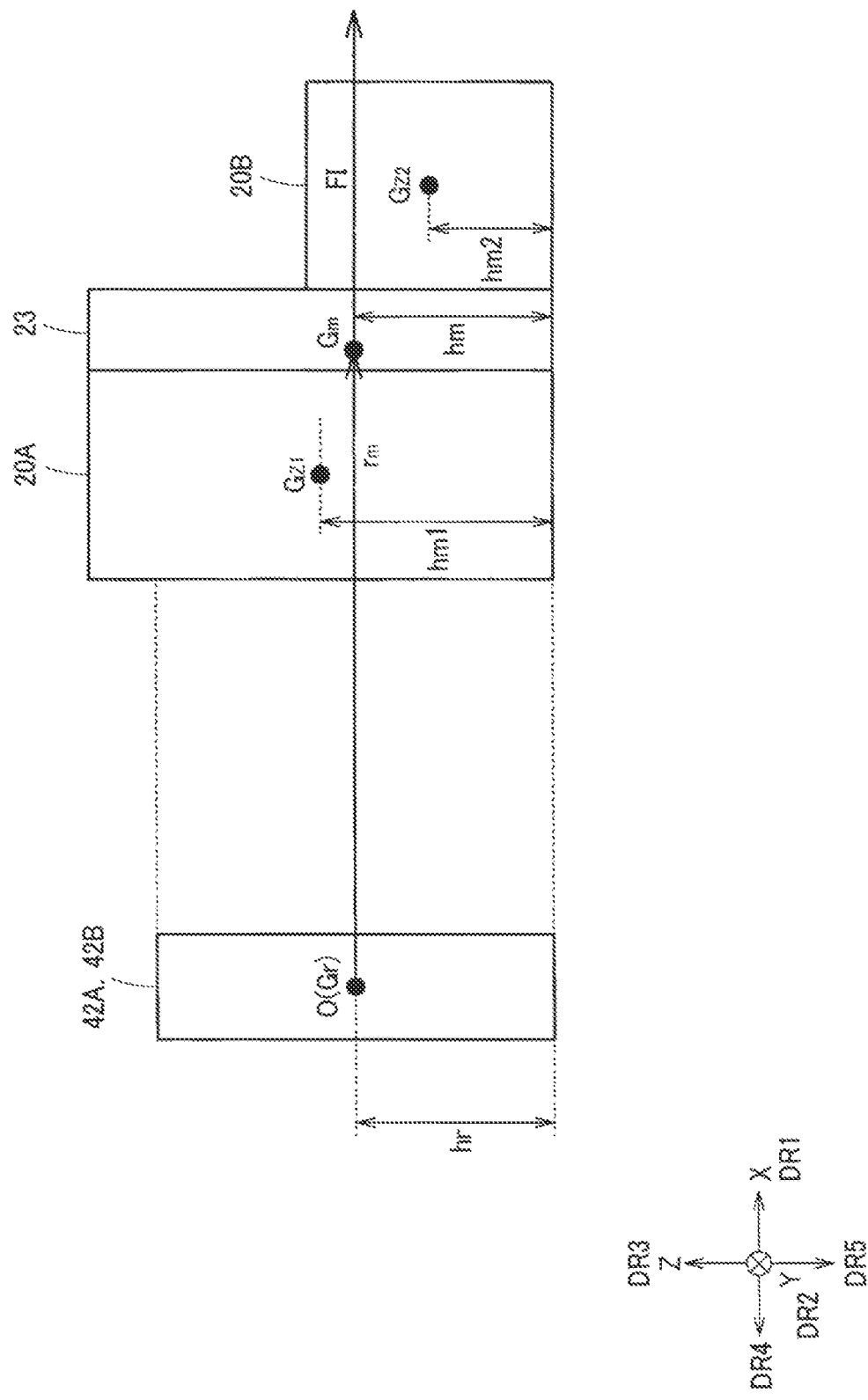
FIG. 7 is a schematic cross-sectional view illustrating a relationship between a gravity center and an inertial force of a movable body when the embodiment is applied.

FIGS. 6 and 7 are schematic cross-sectional views of the physical quantity sensor 1 as viewed from a −Y direction side, and are diagrams illustrating a case where the physical quantity sensor 1 receives an inertial force FI in the first direction DR1. In FIG. 6, the first coupling portions 30A and 30B, the fixed portions 40A and 40B, and the substrate 2 are omitted.

FIG. 6 illustrates the physical quantity sensor 1 in a case where the embodiment is not applied. That is, the positional relationship of the gravity centers of the components in the third direction DR3 is not $G_{Z1} > Gm = Gr > G_{Z2}$ that is illustrated in FIG. 5. In the physical quantity sensor illustrated in FIG. 6, the thickness of the support beams 42A and 42B in the third direction DR3 is the same as the thickness of the first movable electrode group 20A, the first coupling portions 30A and 30B (not illustrated), or the first base portion 23. Therefore, the positional relationship of the gravity centers of the components in the third direction DR3 is $G_{Z1} = Gr > Gm > G_{Z2}$.

Here, heights in the third direction DR3 of the gravity center position Gm of the movable body MB, the gravity center position $G_{Z1}$ of the detection part Z1, and the gravity center position $G_{Z2}$ of the detection part Z2 are defined as hm, hm1, and hm2, respectively. A height of the gravity center position Gr of the support beams 42A and 42B in the third direction DR3 is defined as hr. Here, the height refers to a height in the third direction DR3 with respect to lower ends of the support beams 42A and 42B in the third direction DR3 in a stationary state, that is, in a state where the first coupling portions 30A and 30B of the physical quantity sensor 1 are horizontal to the XY plane. When the positional relationship $G_{Z1} = Gr > Gm > G_{Z2}$ of the gravity centers of the components in the third direction DR3 described with reference to FIG. 6 is established, the heights hm, hm1, hm2, and hr of the gravity center positions of the components satisfy a relationship hm1=hr>hm>hm2.

Hereinafter, a case where the components of the physical quantity sensor 1 have shapes as illustrated in FIG. 6 will be examined. In FIG. 6, when an acceleration in the fourth direction DR4, that is, a −X direction occurs in the physical quantity sensor 1, the inertial force FI in a +X direction, which is a direction opposite thereto, acts on the movable body MB. Here, since the movable body MB is considered to be a rotational physical system that swings with the support beams 42A and 42B as a rotation axis, the gravity center position Gr of the support beams 42A and 42B serving as the rotation axis is set as an origin O. Therefore, the gravity center position Gm of the movable body MB is represented by a position vector $r_m=(r_{mx}, 0, r_{mz})$ inclined by an angle θ from a +X-axis direction since the height hm thereof is lower than the height hr of the origin O. Note that $r_{mz}$ of a Z coordinate is a negative value. The inertial force F acting on the movable body MB is expressed using an inertial force vector FI=($FI_x$, 0, 0) directed in the +X direction from the origin O. In general, a torque T is expressed by an outer product of a position vector (x, y, z) and a force vector ($F_x, F_y, F_z$) as in the following formula (1).

$$\vec{T} = \begin{pmatrix} x \\ y \\ z \end{pmatrix} \times \begin{pmatrix} F_x \\ F_y \\ F_Z \end{pmatrix} = \begin{pmatrix} yF_z - zF_y \\ zF_x - xF_z \\ xF_y - yF_x \end{pmatrix} \quad (1)$$

Accordingly, when the position vector $r_m=(r_{mx}, 0, r_{mz})$ and the inertial force vector FI=($FI_x$, 0, 0) are substituted into formula (1), the torque T generated in the rotational physical system including the movable body MB is obtained as formula (2).

$$\vec{T} = \begin{pmatrix} r_{mx} \\ 0 \\ r_{mz} \end{pmatrix} \times \begin{pmatrix} FI_x \\ 0 \\ 0 \end{pmatrix} = \begin{pmatrix} 0 \\ r_{mz}FI_x \\ 0 \end{pmatrix} \quad (2)$$

As described above, since $r_{mz}$<0, according to formula (2), when the position vector $r_m$ is shifted from the inertial force vector FI by the angle θ, the torque T is a vector having a magnitude of $r_{mz}FI_x$ with the −Y direction as a rotation axis. That is, the first movable electrode groups 20A and 20B of the movable body MB are about to move to a Z direction side on a circular trajectory having the Y axis as a rotation axis. In addition, $r_{mz}FI_x$ in formula (2) is obtained as formula (3) when the angle θ is used.

$$r_{mz}FI_x = r_m FI_x \sin θ \quad (3)$$

That is, when the position vector $r_m$ is inclined from the X-axis direction with respect to the inertial force vector FI along the X-axis direction, the outer product is not zero in formula (1), and the torque T is always generated. As described above, when the height hm of the gravity center position Gm of the movable body MB and the height hr of the gravity center position Gr of the support beams 42A and 42B are different from each other, the outer product in the rotational physical system is not zero, and the movable body MB swings on a circular trajectory around the support beams 42A and 42B. Accordingly, the physical quantity sensor 1 detects an acceleration in a direction other than the third direction DR3, which is an original detection target direction, as the acceleration in the third direction DR3.

Sensitivity of detecting a physical quantity in a direction other than a detection target direction by the physical quantity sensor as the physical quantity in the detection target direction as described above is referred to as sensitivity in other axial directions. In the physical quantity sensor, when the sensitivity in other axial directions increases, a physical quantity other than a detection target physical quantity is detected as the detection target physical quantity, and thus detection accuracy of the physical quantity sensor is degraded. Therefore, it is desirable to reduce the sensitivity in other axial directions as much as possible. In the above description, a case where the mass distribution of each component of the physical quantity sensor 1 is uniform is examined. Even in a case where the mass distribution is not uniform, a similar result is derived when the positional relationship of the gravity centers is as illustrated in FIG. 5.

The physical quantity sensor 1 disclosed in JP-A-2021-032819 described above is a physical quantity sensor of a type in which an area of a fixed electrode and a movable electrode changes similarly to the physical quantity sensor 1 of the embodiment, and detects a physical quantity in the Z-axis direction. However, a thickness of a part of the movable body constituting the movable electrode is designed to be small from the viewpoint of improving an SN ratio of an output signal. Therefore, a height in the Z-axis direction of a gravity center of a torsion spring corresponding to the support beams 42A and 42B is different from a height in the Z-axis direction of a gravity center of the entire movable body including the movable electrode. Accordingly, similarly to the case described with reference to FIG. 6, a position vector from the gravity center of the torsion spring corresponding to the rotation axis to the gravity center of the movable body is shifted from a horizontal direction. As a result, a torque T is generated and the sensitivity in other axial directions increases. As described above, in JP-A-2021-032819, the SN ratio of the output signal can be improved by reducing the thickness of the movable electrode in the Z-axis direction, but a disadvantage occurs that the sensitivity in other axial directions increases.

FIG. 7 is a schematic cross-sectional view of the components of the physical quantity sensor 1 in a case where the embodiment is applied. That is, in this case, the positional relationship of the gravity center positions $G_{Z1}$>Gm=Gr>$G_{Z2}$ as illustrated in FIG. 5 is satisfied. In this case, the position vector $r_m$ from the origin O to the gravity center position Gm of the movable body MB is parallel to the X-axis direction that is the first direction DR1. In this case, when the position vector $r_m=(r_{mx}, 0, 0)$ and the inertial force vector FI=($FI_x$, 0, 0) are substituted into formula (1), the torque T is zero since the position vector $r_m$ is zero except for an x coordinate component. That is, even when the inertial force FI in the X-axis direction acts, the torque T is not generated in the rotational physical system including the movable body MB.

In addition, in the embodiment, by reducing the thickness of either one of the first movable electrode group 20A and the first movable electrode group 20B in the third direction DR3, the advantage of improving an SN ratio of an output signal disclosed in JP-A-2021-032819 is also obtained. Accordingly, in the physical quantity sensor 1, both the improvement of the SN ratio of the output signal and the reduction in the sensitivity in other axial directions can be achieved.

That is, the physical quantity sensor 1 of the embodiment includes the fixed portions 40A and 40B, the support beams 42A and 42B, the movable body MB, and the first fixed electrode groups 10A and 10B. The fixed portions 40A and 40B are fixed to the substrate 2. The support beams 42A and 42B have the one ends coupled to the fixed portions 40A and 40B respectively, and are provided along the second direction DR2. The movable body MB is coupled to the other ends of the support beams 42A and 42B, and the first fixed electrode groups 10A and 10B are provided at the substrate 2 and arranged in the first direction DR1 of the support beams 42A and 42B. The movable body MB includes the first coupling portions 30A and 30B, the first base portion 23, and the first movable electrode groups 20A and 20B. The first coupling portions 30A and 30B are coupled to the other ends of the support beams 42A and 42B respectively, and extend in the first direction DR1 from the support beams 42A and 42B. The first base portion 23 is coupled to the first coupling portions 30A and 30B and provided along the second direction DR2. The first movable electrode groups 20A and 20B provided at the first base portion 23 face the first fixed electrodes 11A and 11B of the first fixed electrode groups 10A and 10B in the second direction DR2. Further, hm=hr, where hm is the height of the gravity center position of the movable body MB in the third direction DR3 and hr is the height of the rotation center of the support beams 42A and 42B in the third direction DR3.

According to the embodiment, the sensitivity in other axial directions of the physical quantity sensor 1 is reduced, and the physical quantity can be detected with high accuracy. In addition, by reducing the thickness of either one of the first movable electrode group 20A and the first movable electrode group 20B in the Z-axis direction, it is possible to maintain the advantage of improving an SN ratio of an output signal disclosed in JP-A-2021-032819.

In the embodiment, a torsion spring is used for the support beams 42A and 42B. Accordingly, since rigidity of the support beams 42A and 42B can be adjusted by adjusting the thickness thereof in the third direction DR3, sensitivity can be easily increased without increasing area thereof, and a size thereof can be reduced. In addition, since the second direction DR2, which is a length direction of the torsion spring, and the first direction DR1, which is a length direction of the comb tooth, are orthogonal to each other, comb tooth lengths of the first movable electrodes 21A and 21B do not become long, and it is possible to improve impact resistance and prevent a defect such as sticking between the electrodes.

Further, in the embodiment, a longitudinal direction of the movable body MB, that is, a longitudinal direction of the first base portion 23 is set to the same direction as the second direction DR2 that is the rotation axis. In this way, even when a swing movement in an in-plane rotation direction of the substrate 2 occurs, a vibration frequency of the swing movement and a frequency in a detection mode of the physical quantity sensor 1 can be separated, and a resonance phenomenon can be prevented. Accordingly, it is possible to prevent vibration caused in a swing mode from interfering with the detection of the physical quantity sensor 1, and it is also possible to prevent an increase in the sensitivity in other axial directions.

2. Detailed Configuration Examples

FIG. 8 is a plan view of a first detailed example of the physical quantity sensor 1 of the embodiment. Similarly to the physical quantity sensor 1 illustrated in FIG. 1, the first detailed example is a physical quantity sensor having an area-changing structure using comb tooth electrodes, whose area changes due to out-of-plane rotation in the third direction DR3. The first detailed example is different from the configuration example illustrated in FIG. 1 in arrangement of the detection part Z1 and the detection part Z2. Specifically, different from the case illustrated in FIG. 1, the detection parts Z1 and Z2 indicated by broken lines in FIG. 8 are arranged side by side along the second direction DR2. Accordingly, the physical quantity sensor 1 shown in the first detailed example includes a second coupling portion 70, a second base portion 63, a second fixed electrode group 50, and a second movable electrode group 60. The second coupling portion 70, the second fixed electrode group 50, and the second movable electrode group 60 correspond to the first coupling portion 30B, the first fixed electrode group 10B, and the first movable electrode group 20B in the configuration in FIG. 1, respectively. The detection part Z1 corresponds to the N side, and the detection part Z2 corresponds to the P side.

In the detection part Z1, in a first fixed electrode group 10, a first fixed electrode 11 is provided at the fourth direction DR4 side and a first fixed electrode 12 is provided at the first direction DR1 side, with the first base portion 23 interposed therebetween. Similarly, in a first movable electrode group 20, a first movable electrode 21 is provided at the fourth direction DR4 side and a first movable electrode 22 is provided at the first direction DR1 side, with the first base portion 23 interposed therebetween. In the detection part Z2, in the second fixed electrode group 50, a second fixed electrode 51 is provided at the fourth direction DR4 side and a second fixed electrode 52 is provided at the first direction DR1 side, with the second base portion 63 interposed therebetween. In the second movable electrode group 60, a second movable electrode 61 is provided at the fourth direction DR4 side and a second movable electrode 62 is provided at the first direction DR1 side, with the second base portion 63 interposed therebetween. In the following description, as appropriate, the first fixed electrodes 11 and 12 are collectively referred to as a first fixed electrode 14, the second fixed electrodes 51 and 52 are collectively referred to as a second fixed electrode 54, the first movable electrodes 21 and 22 are collectively referred to as a first movable electrode 24, and the second movable electrodes 61 and 62 are collectively referred to as a second movable electrode 64. In the first detailed example, the first coupling portion 30 and the second coupling portion 70 are coupled to each other via the first base portion 23 and the second base portion 63.

FIG. 9 is a perspective view of the first detailed example. As illustrated in FIG. 9, the detection part Z1 and the detection part Z2 arranged along the second direction DR2 have different thicknesses of the comb tooth electrodes in the third direction DR3. In the detection part Z1, the thickness of the first fixed electrode group 10 is larger than that of the first movable electrode group 20, and in the detection part Z2, the thickness of the second fixed electrode group 50 is smaller than that of the second movable electrode group 60. Therefore, in the perspective view of FIG. 9, the first movable electrode group 20 and the second fixed electrodes 51 and 52 having a smaller thickness in the third direction DR3 are hidden and invisible.

FIG. 10 shows details of electrode shapes of the detection parts Z1 and Z2 of the first detailed example. An upper part of FIG. 10 illustrates the electrode shape of the detection part Z1. In the first detailed example, differently from the configuration example in FIG. 1, the first movable electrode 21 and the first movable electrode 22 have the same thickness in the third direction DR3. The first fixed electrode 11 and the first fixed electrode 12 also have the same thickness. Positions of ends of the first fixed electrodes 11 and 12 and the first movable electrodes 21 and 22 on a +Z direction side are shifted from each other, and positions of ends the first fixed electrodes 11 and 12 and the first movable electrodes 21 and 22 on a −Z direction side coincide with each other. That is, a one-side offset structure is formed.

A lower part of FIG. 10 illustrates the electrode shape of the detection part Z2 of the first detailed example. Similarly to the detection part Z1, in the detection part Z2, the second movable electrode 61 and the second movable electrode 62 have the same thickness in the third direction DR3, and the second fixed electrode 51 and the second fixed electrode 52 have the same thickness in the third direction DR3. Similarly to the detection part Z1, the detection part Z2 has a one-side offset structure in which positions of ends of the second fixed electrodes 51 and 52 and the second movable electrodes 61 and 62 are shifted from each other only at the +Z direction side.

Figure 11:
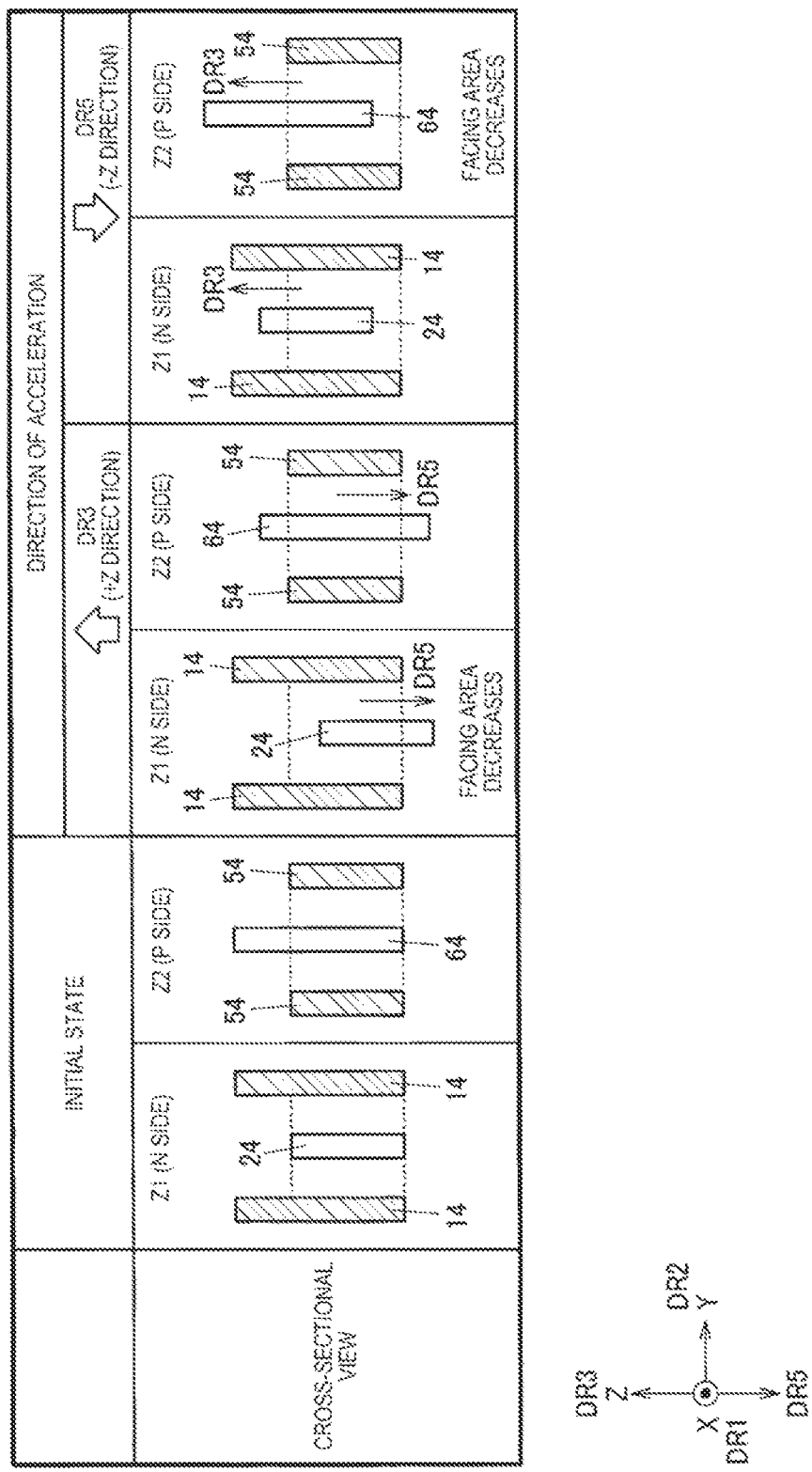
FIG. 11 is a diagram illustrating an operation of the detection part in the first detailed example of the embodiment.

FIG. 11 is a diagram illustrating operations in the first detailed example. An operation principle in the first detailed example is similar to the method described with reference to FIG. 4, and a physical quantity is detected when a facing area of the comb tooth electrodes in either one of the detection parts Z1 and Z2 decreases with respect to an acceleration in the +Z direction or −Z direction. In FIG. 11, when an acceleration in the third direction DR3 occurs, in the detection part Z1, the first movable electrode group 20 receives an inertial force in the fifth direction DR5, that is, the −Z direction, and is displaced in the −Z direction. Therefore, the facing area of the first fixed electrode 14 and the first movable electrode 24 decreases. On the other hand, in the detection part Z2, even when the second movable electrode group 60 receives the inertial force and is displaced in the −Z direction, the facing area does not change. Accordingly, the acceleration in the third direction DR3 can be detected based on the reduction in the facing area in the detection part Z1. When an acceleration in the fifth direction DR5, that is, in the −Z direction occurs, the first movable electrode group 20 receives an inertial force in the +Z direction and is displaced in the +Z direction in the detection part Z1, but the facing area of the first fixed electrode 14 and the first movable electrode 24 does not change. On the other hand, in the detection part Z2, the second movable electrode group 60 receives the inertial force and is displaced in the +Z direction, and thus the facing area of the second fixed electrode 54 and the second movable electrode 64 decreases. In the first detailed example, the detection part Z1 corresponds to the N side of the probe, and the detection part Z2 corresponds to the P side of the probe.

That is, as illustrated in FIG. 8, in the embodiment, the physical quantity sensor 1 includes the second fixed electrode group 50 that is provided at the substrate 2 and that is arranged in the first direction DR1 of the support beams 42A and 42B. The movable body MB includes the second coupling portion 70, the second base portion 63, and the second movable electrode group 60. The second coupling portion 70 is coupled to the other end of the support beam 42B and extends from the support beam 42B in the first direction DR1. The second base portion 63 is coupled to the second coupling portion 70 and is provided along the second direction DR2. The second movable electrode group 60 is provided at the second base portion 63 and faces the second fixed electrodes 51 and 52 of the second fixed electrode group 50 in the second direction DR2.

In this way, the two detection parts Z1 and Z2 can be provided in the physical quantity sensor 1, and the detection parts Z1 and Z2 can be arranged side by side along the second direction DR2 that is a rotation axis of swing movement of the movable body MB.

In the embodiment, the first movable electrode group 20 and the second movable electrode group 60 are arranged along the second direction DR2 between the first coupling portion 30 and the second coupling portion 70.

In this way, the detection parts Z1 and Z2 can be provided along the second direction DR2 between the first coupling portion 30 and the second coupling portion 70 of the physical quantity sensor 1 in the plan view.

As illustrated in FIG. 7, in the embodiment, hm1>hr>hm2, where hm1 is a height of a gravity center position of the first movable electrode group 20 in the third direction DR3 and hm2 is a height of a gravity center position of the second movable electrode group 60 in the third direction DR3.

In this way, it is possible to make the thickness of the second movable electrode group 60 in the third direction DR3 larger than a thickness at the rotation center of the support beams 42A and 42B in the third direction DR3 while making the height of the gravity center position Gm of the movable body MB and the height of the gravity center position of the support beams 42A and 42B coincide with each other in the third direction DR3.

In the embodiment, the thickness of the second movable electrode group 60 in the third direction DR3 is larger than the thickness of the first movable electrode group 20 in the third direction DR3.

In this way, in the detection part Z1, it is easy to make the thickness of the first movable electrode group 20 in the third direction DR3 smaller than the thickness of the first fixed electrode group 10 in the third direction DR3. In addition, also in the detection part Z2, it is easy to make the thickness of the second movable electrode group 60 in the third direction DR3 larger than the thickness of the second fixed electrode group 50 in the third direction DR3.

In the embodiment, in an initial state, a back surface position of the first movable electrode group 20 in the third direction DR3 coincides with a back surface position of the second movable electrode group 60 in the third direction DR3.

In this way, the probe of the comb tooth electrodes including the first fixed electrodes 11 and 12 and the first movable electrodes 21 and 22 can be formed in a one-side offset shape offset in the third direction DR3. In addition, the probe of the comb tooth electrodes including the second fixed electrodes 51 and 52 and the second movable electrodes 61 and 62 can be formed in a one-side offset shape offset in the third direction DR3.

Figure 12:
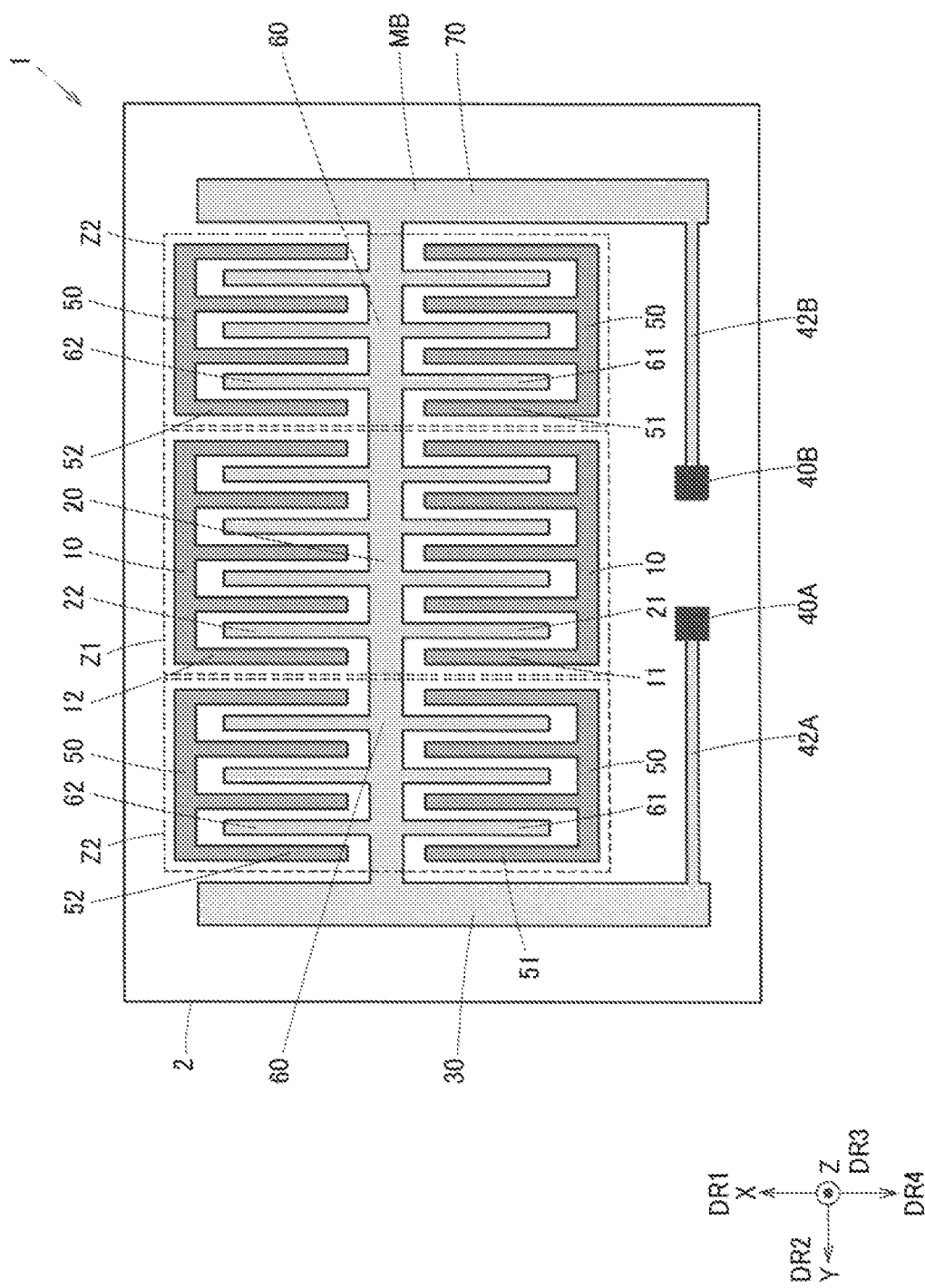
FIG. 12 is a plan view of a second detailed example of the embodiment.

FIG. 12 is a plan view of a second detailed example of the physical quantity sensor 1 of the embodiment. An arrangement pattern of the detection parts Z1 and Z2 is different from that in the first detailed example. Specifically, in the plan view in the third direction DR3 as illustrated in FIG. 12, the detection parts are arranged in an order of the detection part Z2, the detection part Z1, and the detection part Z2 from the second direction DR2 side. As described, a plurality of the detection parts Z1 and Z2 can be provided and alternately arranged along the second direction DR2.

Figure 13:
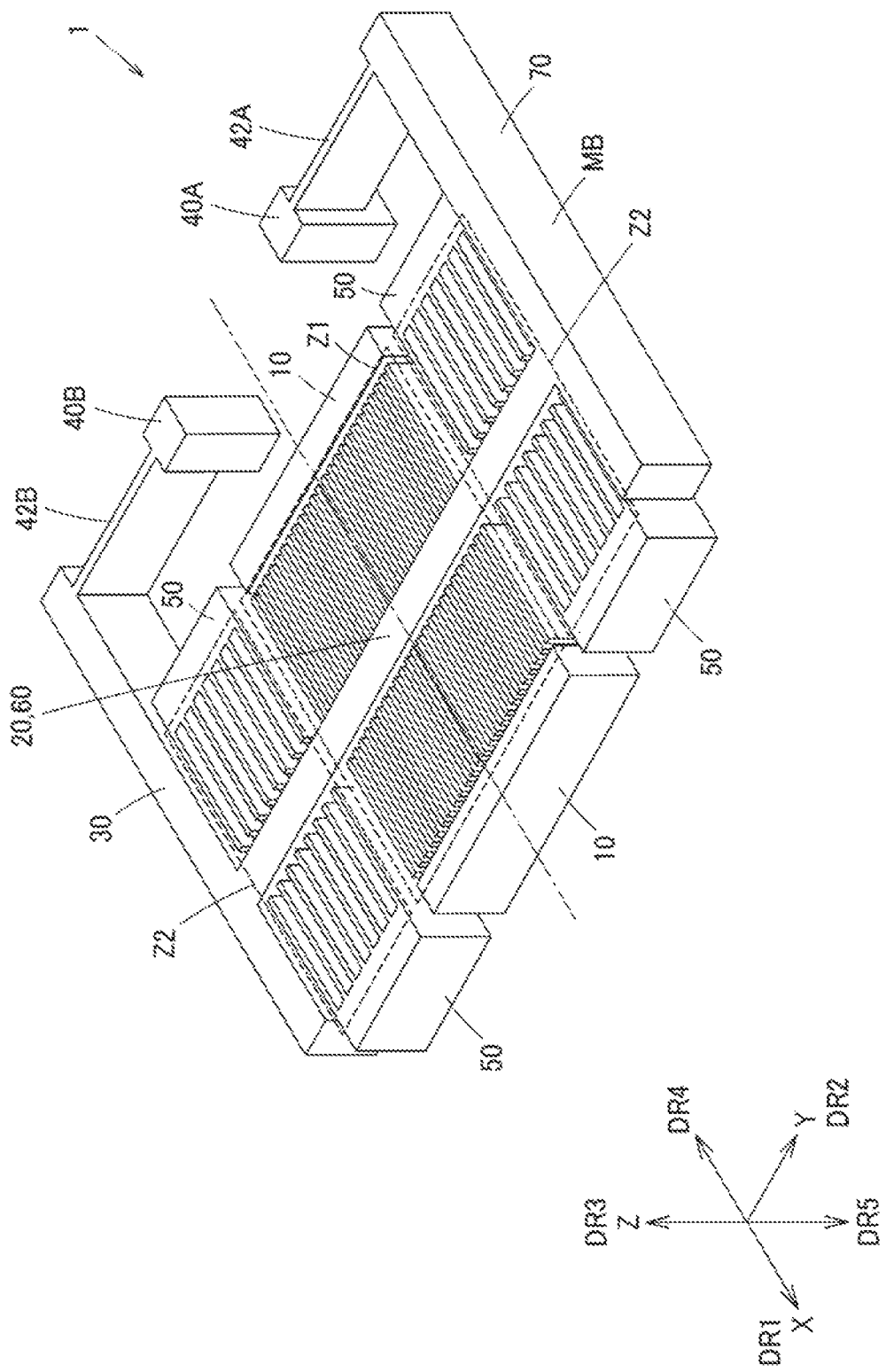
FIG. 13 is a perspective view of the second detailed example of the embodiment.

FIG. 13 is a perspective view of the second detailed example. The second detailed example is similar to that in FIG. 9 except for the arrangement pattern of the detection parts Z1 and Z2. Comparing the second detailed example with the first detailed example, mass distribution in the second detailed example is symmetrical with respect to the X-axis indicated by a one-dot chain line in FIG. 13. Therefore, according to the second detailed example, when an acceleration in the third direction DR3 occurs, a variation in the displacement of the movable body MB in the third direction DR3 can be prevented. Accordingly, detection accuracy of the physical quantity sensor 1 can be improved. Since various variations are conceivable as the arrangement patterns of the detection parts Z1 and Z2, an optimum arrangement pattern can be selected in accordance with a space in which the comb tooth electrodes of the physical quantity sensor 1 can be arranged.

As a modification of the first detailed example having the one-side offset structure, several configurations are conceived. For example, in FIG. 14, the first fixed electrode 14 of the detection part Z1 and the second movable electrode 64 of the detection part Z2 may have different thicknesses, and the first movable electrode 24 of the detection part Z1 and the second fixed electrode 54 of the detection part Z2 may have different thicknesses. A thickness of the movable body MB may be smaller or larger than the thickness of the first movable electrode 24 of the detection part Z1. Here, a thickness of the support beams 42A and 42B that are torsion springs is in a range of being larger than the smallest thickness and smaller than the largest thickness among the thicknesses of the movable body MB and the movable electrodes of the detection parts Z1 and Z2. Regarding the first detailed example and the second detailed example, a configuration in which only back surfaces of the comb tooth electrodes are flush with each other is described above as an example, and alternatively only front surfaces thereof may be flush with each other. In any of the modifications described above, it is sufficient that the position of the gravity center position Gm of the movable body MB in the third direction DR3 and the position of the gravity center position Gr of the support beams 42A and 42B in the third direction DR3 coincide with each other as described with reference to FIG. 7. As long as such a positional relationship of the gravity centers is established, the configuration of the embodiment is not limited to the above.

Figure 14:
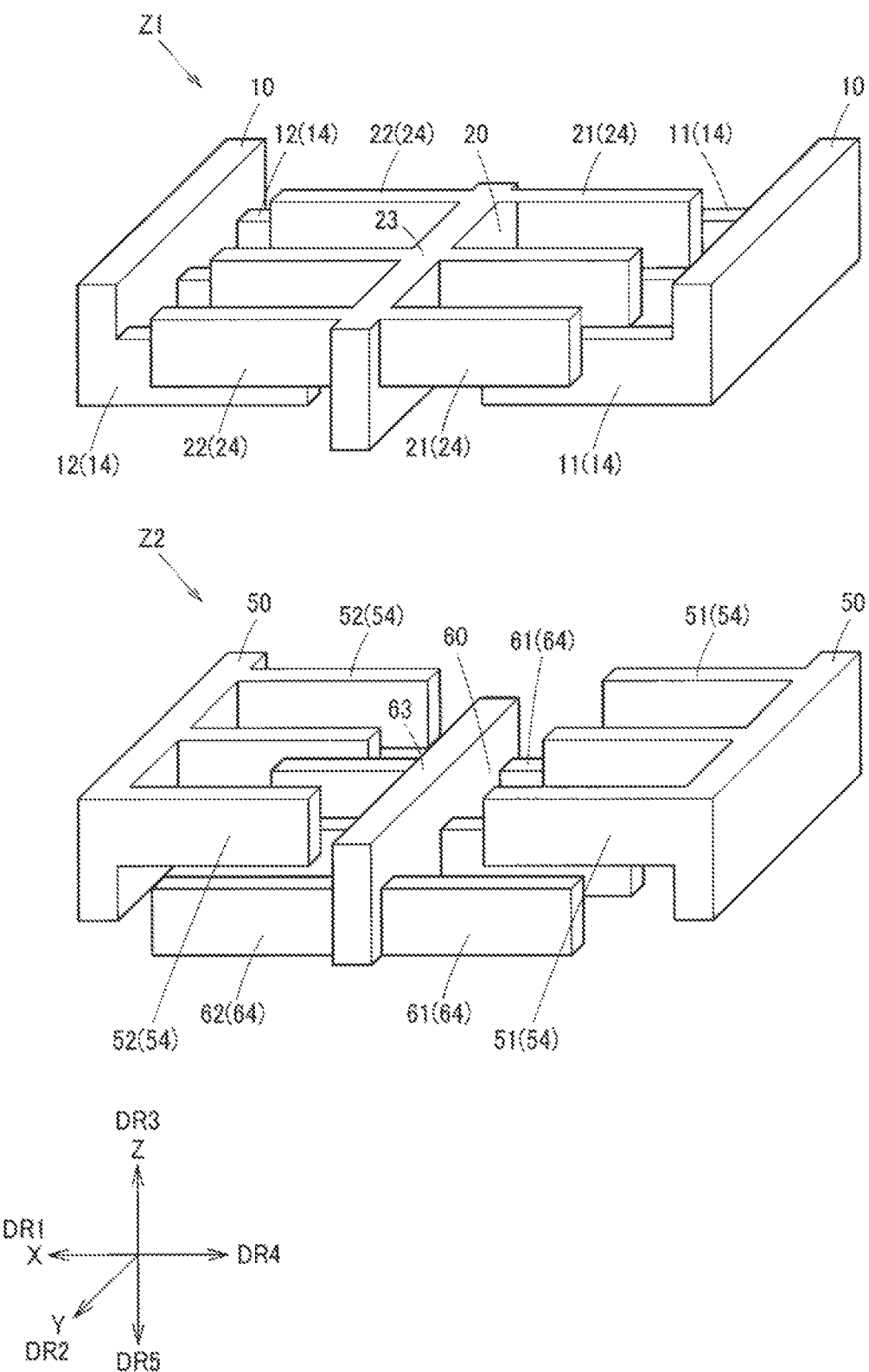
FIG. 14 is a perspective view of a detection part in a third detailed example of the embodiment.

Further, in the first detailed example and the second detailed example, the comb tooth electrodes of the detection parts Z1 and Z2 have the one-side offset shape, but may have a two-side offset shape. FIG. 14 is a schematic view illustrating a configuration of portions of the comb tooth electrodes in a third detailed example in which the comb tooth electrodes of the first detailed example and the second detailed example are made to have a two-side offset shape. An upper part of FIG. 14 illustrates a shape of the comb tooth electrodes in the detection part Z1, and a lower part illustrates a shape of the comb tooth electrodes in the detection part Z2.

In the detection part Z1, the first movable electrodes 21 and 22 are shifted from the first fixed electrodes 11 and 12 toward the third direction DR3 side, and when viewed from the second direction DR2, the first fixed electrode 11 partially overlaps the first movable electrode 21, and the first fixed electrode 12 partially overlaps the first movable electrode 22. In this way, the comb tooth electrodes of the detection part Z1 have a two-side offset shape. In the detection part Z2, the second movable electrodes 61 and 62 are shifted from the second fixed electrodes 51 and 52 toward the fifth direction DR5 side, and when viewed from the second direction DR2, the second fixed electrode 51 partially overlaps the second movable electrode 61, and the second fixed electrode 52 partially overlaps the second movable electrode 62. In this way, the comb tooth electrodes of the detection part Z2 also have a two-side offset shape.

A positional relationship of the components in the third direction DR3 in the third detailed example will be supplemented. Here, a surface on the third direction DR3 side is referred to as a front surface, and a surface on the fifth direction DR5 side is referred to as a back surface. In the detection part Z1, front and back surfaces of the first movable electrode 24 are positioned in the +Z direction with respect to front and back surfaces of the first fixed electrode 14, respectively, and in the detection part Z2, front and back surfaces of the second movable electrode 64 are positioned in the −Z direction with respect to front and back surfaces of the second fixed electrode 54, respectively. The front and back surfaces of the first movable electrode 24 of the detection part Z1 are flush with the front and back surfaces of the second fixed electrode 54 of the detection part Z2, respectively, and the first movable electrode 24 and the second fixed electrode 54 have the same thickness. The front and back surfaces of the first fixed electrode 14 of the detection part Z1 are flush with the front and back surfaces of the second movable electrode 64 of the detection part Z2, respectively, and the first fixed electrode 14 and the second movable electrode 64 have the same thickness. The amount of offset in the third direction DR3 between the front surface of the first movable electrode 24 and the front surface of the first fixed electrode 14 in the detection part Z1 is equal to the amount of offset in the fifth direction DR5 between the back surface of the second movable electrode 64 and the back surface of the second fixed electrode 54 in the detection part Z2. Front surfaces of the first coupling portion 30 and the second coupling portion 70 of the movable body MB are flush with the front surfaces of the first movable electrode 24 of the detection part Z1 and the second fixed electrode 54 of the detection part Z2. Back surfaces of the first coupling portion 30 and the second coupling portion 70 of the movable body MB are flush with the back surfaces of the first fixed electrode 14 of the detection part Z1 and the second movable electrode 64 of the detection part Z2. Front and back surfaces of the support beams 42A and 42B that are torsion springs coincide with front and back surfaces of the movable body MB.

Figure 15:
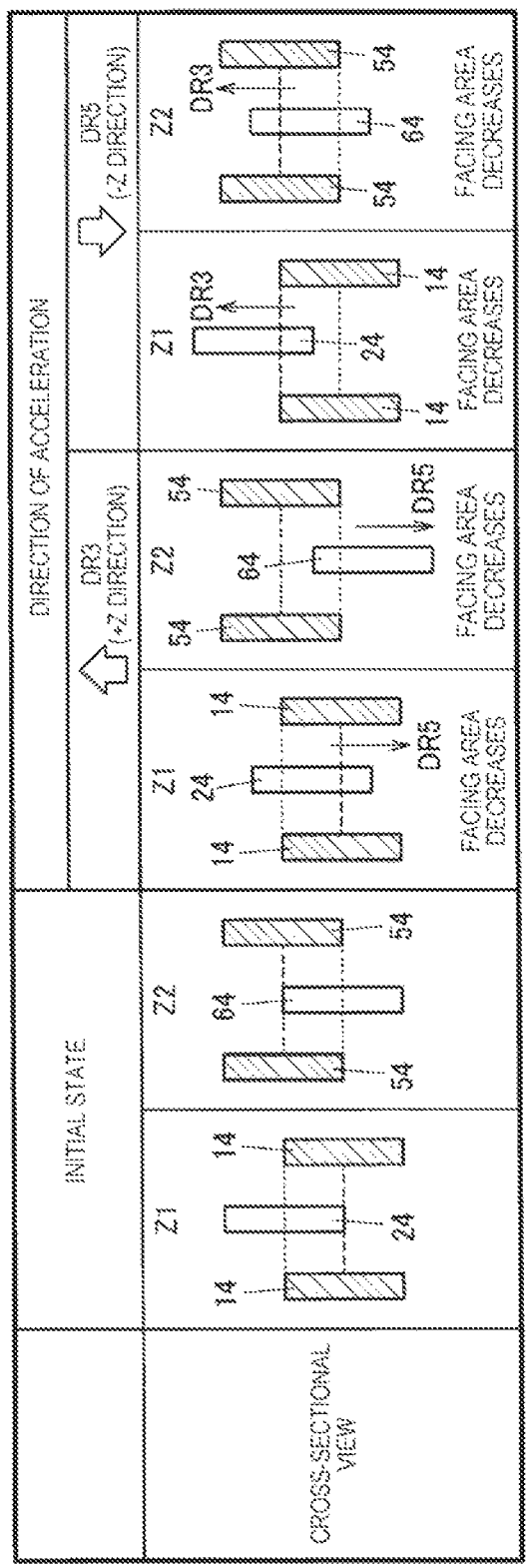
FIG. 15 is a diagram illustrating an operation of the detection part in the third detailed example of the embodiment.

FIG. 15 is a diagram illustrating operations of the physical quantity sensor 1 to which the third detailed example is applied. Similar to the explanatory diagrams of the operations illustrated in FIG. 4, movements of the comb tooth electrodes in an initial state and a state, in which an acceleration is applied, are illustrated. In the third detailed example to which the two-side offset shape is applied, the movable body MB performs out-of-plane rotation with the support beams 42A and 42B serving as a rotation axis, and a facing area of the comb tooth electrodes increases in one of the detection parts Z1 and Z2 and decreases in the other of the detection parts Z1 and Z2. That is, differently from the configuration example in FIG. 1, the first detailed example, and the second detailed example described above, in the third detailed example, the facing area of the comb tooth electrodes changes regardless of whether the first movable electrode 24 and the second movable electrode 64 are displaced in the third direction DR3 or the fifth direction DR5, and thus detection sensitivity of a physical quantity is doubled as compared with that in the configuration example in FIG. 1 and the like. Therefore, compared with the configuration example in which the one-side offset shape is applied, it is advantageous in terms of high sensitivity of physical quantity detection.

That is, in the embodiment, the thickness of the first movable electrode group 20 in the third direction DR3 is equal to the thickness of the second movable electrode group 60 in the third direction DR3. Further, in the embodiment, in the initial state, a back surface position of the first movable electrode group 20 in the third direction DR3 does not coincide with a back surface position of the second movable electrode group 60 in the third direction DR3.

In this way, the probe of the comb tooth electrodes including the first fixed electrodes 11 and 12 and the first movable electrodes 21 and 22 can be formed in the two-side offset shape offset in both the third direction DR3 and the fifth direction DR5. Further, the probe of the comb tooth electrodes including the second fixed electrodes 51 and 52 and the second movable electrodes 61 and 62 can be formed in the two-side offset shape offset in both the third direction DR3 and the fifth direction DR5.

Figure 16:
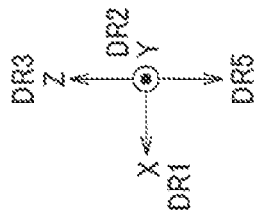
FIG. 16 is a diagram illustrating a positional relationship between centers of gravity of components in the third detailed example of the embodiment.

FIG. 16 is a schematic cross-sectional view illustrating a positional relationship of gravity centers of the components in the third detailed example to which the two-side offset shape is applied. As described with reference to FIG. 5, in the embodiment, by designing the gravity center positions of the components of the physical quantity sensor 1 so as to satisfy the relationship $G_{Z1}>Gm=Gr>G_{Z2}$, it is possible to prevent a torque from being generated with respect to an acceleration or the like in the first direction DR1 other than the third direction DR3 and to reduce sensitivity in other axial directions.

In this regard, in the third detailed example, as illustrated in a left part of FIG. 16, as viewed from the second direction DR2, the first movable electrode 24 and the second movable electrode 64 partially overlap each other, and are shifted by the same length in the third direction DR3 and the fifth direction DR5, respectively. Due to such a positional relationship of the comb tooth electrodes, it is easy to cause a gravity center of a movable portion in the third direction to coincide with the gravity center of the support beams 42A and 42B in the third direction. For example, by setting positions of the support beams 42A and 42B, the movable portion, and the first movable electrode 24 in the third direction DR3 to coincide with each other, and by setting positions of the support beams 42A and 42B, the movable portion, and the second movable electrode 64 in the fifth direction DR5 to coincide with each other, the positional relationship $G_{Z1}>Gm=Gr>G_{Z2}$ can be necessarily achieved.

Figure 17:
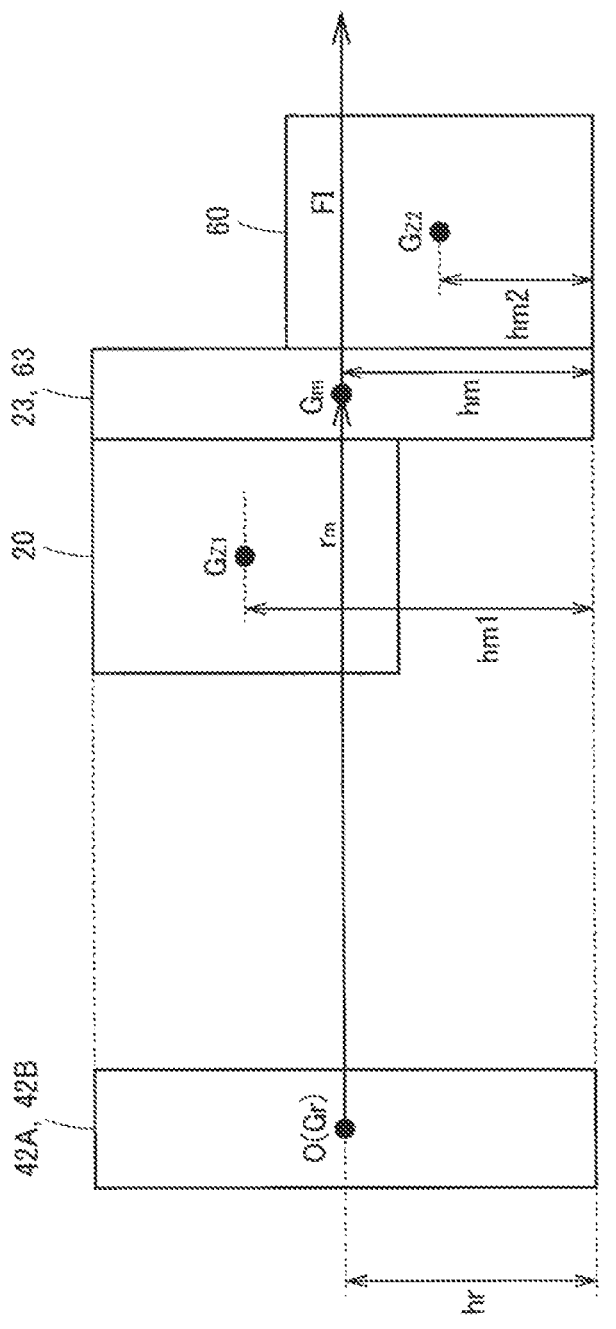
FIG. 17 is a schematic cross-sectional view illustrating a relationship between a gravity center and an inertial force of a movable body in the third detailed example.

FIG. 17 is a schematic cross-sectional view of the components of the physical quantity sensor 1 to which the third detailed example is applied. As described above, the positional relationship $G_{Z1}>Gm=Gr>G_{Z2}$ is achieved, and the height hm of the gravity center position of the movable body MB in the third direction DR3 is equal to the height hr of the gravity center position of the support beams 42A and 42B in the third direction DR3. Therefore, the position vector $r_m$ is parallel to the first direction DR1. Therefore, as described with reference to FIG. 7, even when the inertial force FI in the first direction DR1 acts on the physical quantity sensor 1, the swing movement of the movable body MB with the support beams 42A and 42B as the rotation axis is not affected, and the sensitivity in other axial directions of the physical quantity sensor 1 is reduced.

Figure 18:
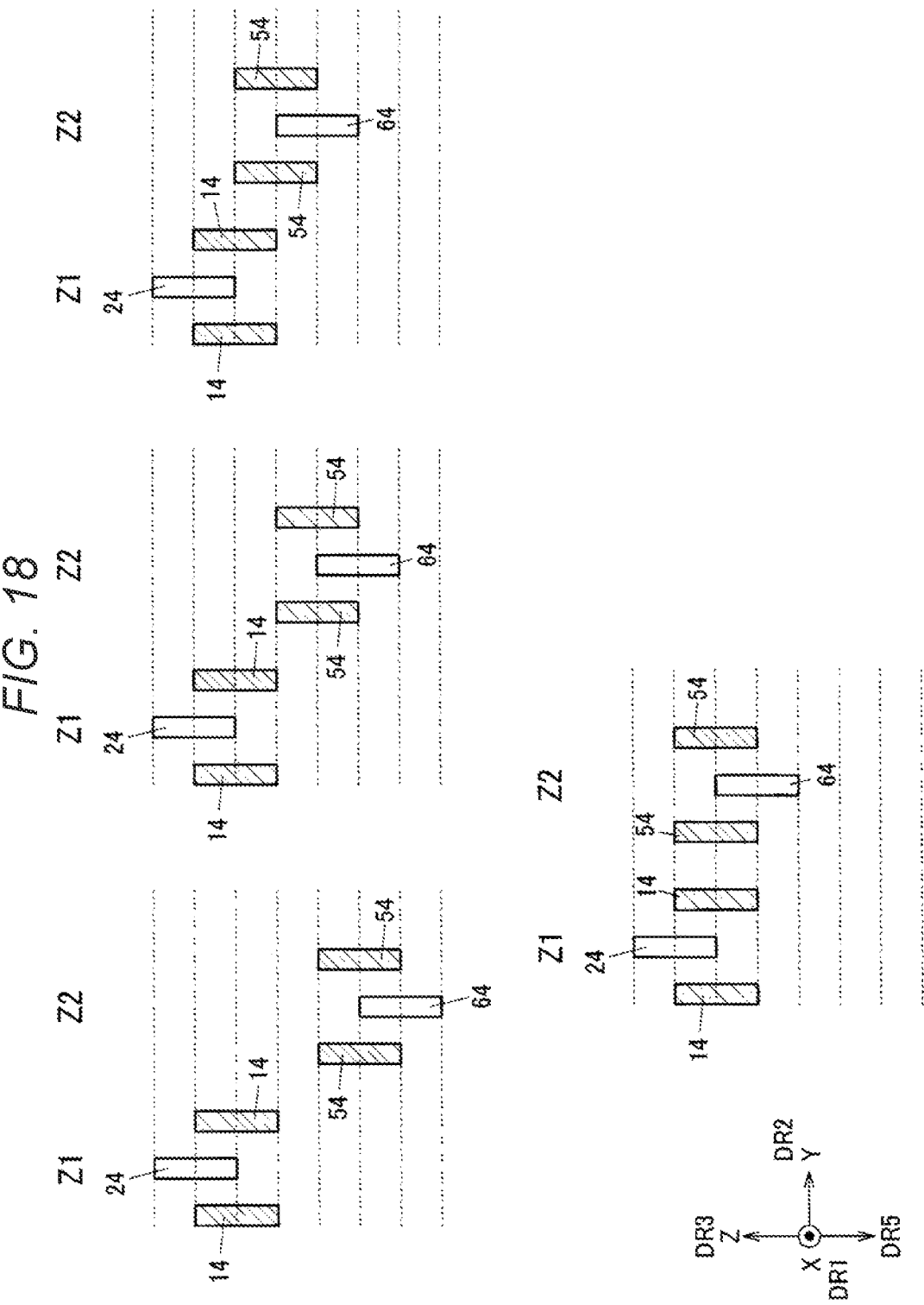
FIG. 18 illustrates examples of an arrangement pattern of fixed electrodes and movable electrodes in a YZ cross section in the third detailed example.

As described above, also in the third detailed example, the positional relationship $G_{Z1}>Gm=Gr>G_{Z2}$ is satisfied for the gravity center positions of the components. That is, the gravity center position Gm in a thickness direction of the movable body MB in the third direction DR3 and the gravity center position Gr in a thickness direction of the support beams 42A and 42B in the third direction DR3 coincide with each other in the third direction DR3. As the third detailed example, several modifications having such a positional relationship of the gravity centers are conceived. FIG. 18 illustrates variations of the third detailed example other than the configuration of the comb tooth electrodes illustrated in FIGS. 14 and 15. As illustrated in FIG. 18, four variations are conceived depending on the number of level lines indicating positions of the first fixed electrode 14 and the first movable electrode 24 of the detection part Z1 in the third direction DR3 and positions of the second fixed electrode 54 and the second movable electrode 64 of the detection part Z2 in the third direction DR3. A comb teeth-shaped pattern shown on the left of an upper row is a pattern in which positions of front and back surfaces of all of the first fixed electrode 14, the second fixed electrode 54, the first movable electrode 24, and the second movable electrode 64 are shifted from each other, and the number of level lines thereof is the largest. The number of level lines decreases in the order of the center of the upper row, the right of the upper row, and the lower row. A shape pattern having the smallest number of level lines has the configuration illustrated in FIG. 14.

In addition, variations in the positional relationship of the movable body MB and the support beams 42A and 42B are also conceivable. For example, a pattern in which a front surface of the movable body MB is not flush with front surfaces of the first movable electrode 24 of the detection part Z1 and the second fixed electrode 54 of the detection part Z2, or a case in which a back surface of the movable body MB is not flush with back surfaces of the first fixed electrode 14 of the detection part Z1 and the second fixed electrode 54 of the detection part Z2 may be conceived. In addition, a case may be conceived in which front and back surfaces of the support beams 42A and 42B may be flush with only one of front and back surfaces of the movable body MB or neither of the front and back surfaces thereof. In this case, regardless of the thickness of the support beams 42A and 42B in the third direction, when the thickness is small, the displacement becomes large, and detection sensitivity of a physical quantity can be increased, which is an advantage.

3. Inertial Measurement Unit

Figure 19:
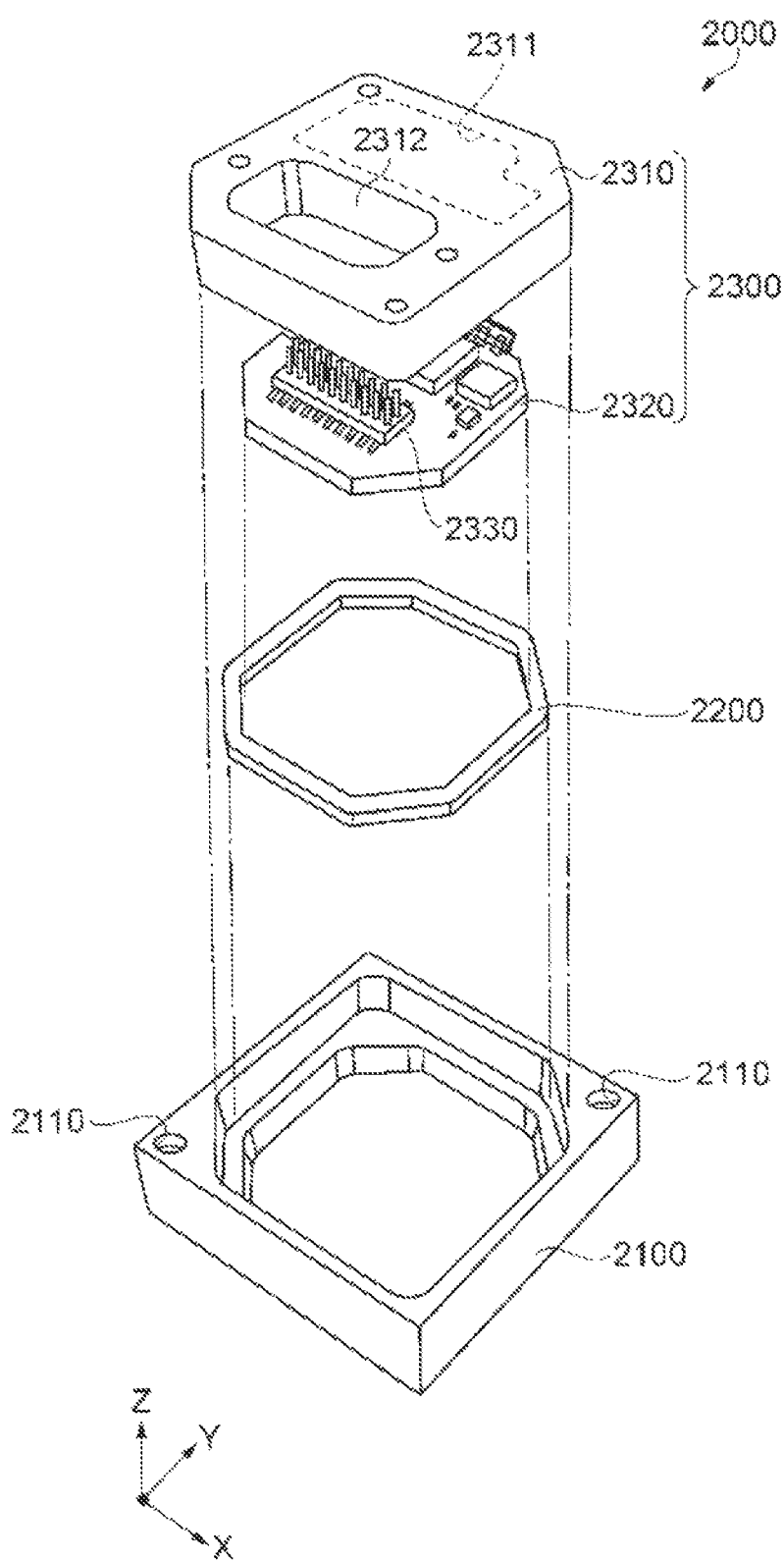
FIG. 19 is an exploded perspective view illustrating a schematic configuration of an inertial measurement unit including a physical quantity sensor.

Next, an example of an inertial measurement unit 2000 according to the embodiment will be described with reference to FIGS. 19 and 20. The inertial measurement unit (IMU) 2000 shown in FIG. 19 is a unit that detects an inertial movement amount of a posture or an action of a moving body such as an automobile or a robot. The inertial measurement unit 2000 is a so-called six-axis motion sensor including an acceleration sensor that detects accelerations ax, ay, and az in directions along three axes and an angular velocity sensor that detects angular velocities ωx, ωy, and ωz around the three axes.

The inertial measurement unit 2000 is a rectangular parallelepiped having a substantially square planar shape. Screw holes 2110 as mount portions are formed in the vicinity of two vertexes positioned in a diagonal direction of the square. Two screws can be passed through the two screw holes 2110 to fix the inertial measurement unit 2000 to a mounted surface of a mounted body such as an automobile. By component selection or design change, for example, it is also possible to reduce a size of the inertial measurement unit 2000 to such a degree that allows the inertial measurement unit 2000 to be mounted on a smartphone or a digital camera.

The inertial measurement unit 2000 includes an outer case 2100, a bonding member 2200, and a sensor module 2300, and has a configuration in which the sensor module 2300 is inserted inside the outer case 2100 with the bonding member 2200 interposed therebetween. The sensor module 2300 includes an inner case 2310 and a circuit board 2320. The inner case 2310 is formed with a recess 2311 for preventing contact with the circuit board 2320 and an opening 2312 for exposing a connector 2330 to be described later. Further, the circuit board 2320 is bonded to a lower surface of the inner case 2310 via an adhesive.

Figure 20:
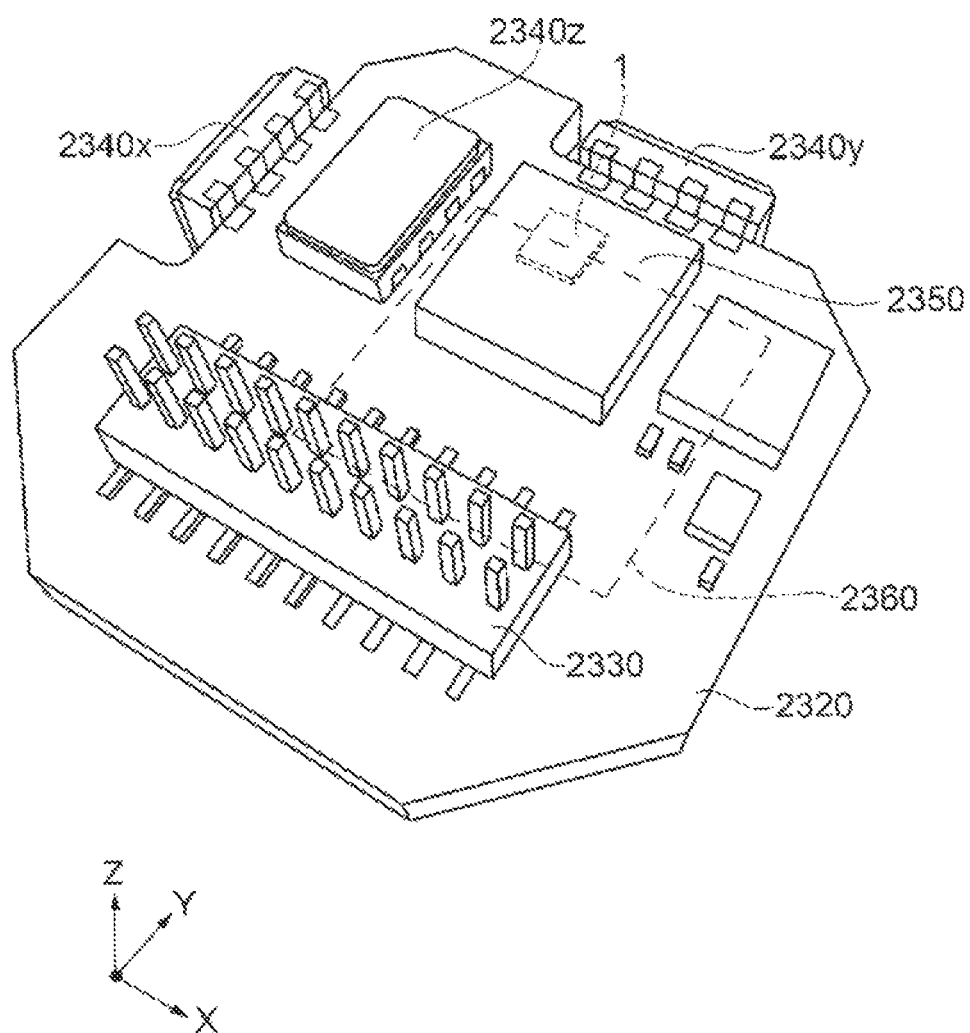
FIG. 20 is a perspective view of a circuit board of the physical quantity sensor.

As illustrated in FIG. 20, the connector 2330, an angular velocity sensor 2340z that detects an angular velocity around the Z axis, an acceleration sensor unit 2350 that detects an acceleration in each axial direction of an X axis, a Y axis, and the Z axis, and the like are mounted at an upper surface of the circuit board 2320. Further, an angular velocity sensor 2340x that detects an angular velocity around the X axis and an angular velocity sensor 2340y that detects an angular velocity around the Y axis are mounted at a side surface of the circuit board 2320.

The acceleration sensor unit 2350 includes at least the physical quantity sensor 1 that measures the acceleration in the Z-axis direction described above, and can detect an acceleration in one axial direction or an acceleration in two axial directions or three axial directions as necessary. The angular velocity sensors 2340x, 2340y, and 2340z are not particularly limited, and for example, a vibration gyro sensor using the Coriolis force can be used.

A control IC 2360 is mounted at a lower surface of the circuit board 2320. The control IC 2360 serving as a control unit that performs control based on a detection signal output from the physical quantity sensor 1 is, for example, a micro controller unit (MCU), includes a storage unit including a nonvolatile memory, an A/D converter, and the like therein, and controls each unit of the inertial measurement unit 2000. In addition, a plurality of electronic components are also mounted at the circuit board 2320.

As described above, the inertial measurement unit 2000 according to the embodiment includes the physical quantity sensor 1 and the control IC 2360 serving as the control unit that performs the control based on the detection signal output from the physical quantity sensor 1. According to the inertial measurement unit 2000, since the acceleration sensor unit 2350 including the physical quantity sensor 1 is used, an effect of the physical quantity sensor 1 can be enjoyed, and the inertial measurement unit 2000 capable of implementing high accuracy and the like can be provided.

The inertial measurement unit 2000 is not limited to the configurations in FIGS. 19 and 20. For example, the inertial measurement unit 2000 may have a configuration in which only the physical quantity sensor 1 is provided as the inertial sensor without providing the angular velocity sensors 2340x, 2340y, and 2340z. In this case, for example, the inertial measurement unit 2000 may be implemented by accommodating the physical quantity sensor 1 and the control IC 2360 implementing the control unit in a package that is an accommodating container.

As described above, a physical quantity sensor of the embodiment includes a fixed portion, a support beam, a movable body MB, and a first fixed electrode group. The fixed portion is fixed to a substrate, and the support beam has one end coupled to the fixed portion and is provided along a second direction. The movable body is coupled to the other end of the support beam, and the first fixed electrode group is provided at the substrate and arranged in a first direction of the support beam. The movable body includes a first coupling portion, a first base portion, and a first movable electrode group. The first coupling portion is coupled to the other end of the support beam and extends in the first direction from the support beam, the first base portion is coupled to the first coupling portion and is provided along the second direction, and the first movable electrode group provided at the first base portion faces the first fixed electrode group in the second direction. Further, hm=hr, where hm is a height of a gravity center position of the movable body in a third direction and hr is a height of a rotation center of the support beam in the third direction.

According to the embodiment, even when an acceleration in the first direction occurs, since an inertial force caused by the acceleration is parallel to a position vector from the support beam to the gravity center position of the movable body, no torque is generated. Accordingly, it is possible to prevent a physical quantity in the first direction other than the third direction, which is a detection target direction, from being detected as a physical quantity in the third direction. Therefore, according to the embodiment, sensitivity in other axial directions of the physical quantity sensor is reduced, and the physical quantity can be detected with high accuracy.

Further, in the embodiment, a second fixed electrode group is provided at the substrate and arranged in the first direction of the support beam. The movable body includes a second coupling portion coupled to the other end of the support beam and extending in the first direction from the support beam, a second base portion coupled to the second coupling portion and provided along the second direction, and a second movable electrode group provided at the second base portion and facing the second fixed electrode group in the second direction.

In this way, two detection parts can be provided in the physical quantity sensor, and the two detection parts can be arranged side by side along the second direction that is a rotation axis of a swing movement of the movable body.

In the embodiment, the first movable electrode group and the second movable electrode group are arranged along the second direction between the first coupling portion and the second coupling portion.

In this way, two detection parts can be provided along the second direction between the first coupling portion and the second coupling portion of the physical quantity sensor in a plan view.

In the embodiment, hm1>hr>hm2, where hm1 is a height of a gravity center position of the first movable electrode group in the third direction and hm2 is a height of a gravity center position of the second movable electrode group in the third direction.

In this way, it is possible to make a thickness of the second movable electrode group in the third direction larger than a thickness at a rotation center of the support beam in the third direction while making the height of the gravity center position of the movable body and the height of the gravity center position of the support beam coincide with each other in the third direction.

In the embodiment, the thickness of the second movable electrode group in the third direction is larger than the thickness of the first movable electrode group in the third direction.

In this way, in the detection part including the first movable electrode group, it is easy to make the thickness of the first movable electrode group in the third direction smaller than the thickness of the first fixed electrode group in the third direction. In the detection part including the second movable electrode group, it is easy to make the thickness of the second movable electrode group in the third direction larger than the thickness of the second fixed electrode group in the third direction.

Further, in the embodiment, in an initial state, a back surface position of the first movable electrode group in the third direction coincides with a back surface position of the second movable electrode group in the third direction.

In this way, comb tooth electrodes including the first fixed electrode and the first movable electrode can be formed in a one-side offset shape offset in the third direction. Further, comb tooth electrodes including the second fixed electrode and the second movable electrode can be formed in a one-side offset shape offset in the third direction.

In the embodiment, the thickness of the first movable electrode group in the third direction is equal to the thickness of the second movable electrode group in the third direction.

Further, in the embodiment, in the initial state, the back surface position of the first movable electrode group in the third direction does not coincide with the back surface position of the second movable electrode group in the third direction.

In this way, comb tooth electrodes including the first fixed electrode and the second movable electrode can be formed in a two-side offset shape offset in both the third direction and a fifth direction. In addition, comb tooth electrodes including the second fixed electrode and the second movable electrode can be formed in the two-side offset shape offset in both the third direction and the fifth direction.

As described above, in the embodiment, the support beam is a torsion spring that is twisted with the second direction as a rotation axis. In this way, the movable body can perform a swing movement with the second direction as a rotation axis.

The embodiment relates to an inertial measurement unit including a control unit configured to perform control based on a detection signal output from the physical quantity sensor.

Although the embodiments have been described in detail as described above, it will be readily apparent to those skilled in the art that various modifications may be made without departing substantially from novel matters and effects of the present disclosure. Accordingly, such modifications are intended to be included in the scope of the present disclosure. For example, a term cited with a different term having a broader meaning or the same meaning at least once in the description or in the drawings can be replaced with the different term at any place in the description or in the drawings. In addition, all combinations of the embodiments and the modifications are also included in the scope of the present disclosure. The configurations, operations, and the like of the physical quantity sensor and the inertial measurement unit are not limited to those described in the embodiments, and various modifications can be made.

What is claimed is:

1. A physical quantity sensor that, when three directions orthogonal to one another are defined as a first direction, a second direction, and a third direction, detects a physical quantity in the third direction, the physical quantity sensor comprising:
    a fixed portion fixed to a substrate;
    a support beam having one end coupled to the fixed portion and provided along the second direction;
    a movable body coupled to the other end of the support beam;
    a first fixed electrode group provided at the substrate and arranged in the first direction of the support beam; and
    a second fixed electrode group provided at the substrate and arranged in the first direction of the support beam,
    wherein the movable body includes:
        a first coupling portion coupled to the other end of the support beam and extending from the support beam in the first direction;
        a first base portion coupled to the first coupling portion and provided along the second direction;
        a first movable electrode group provided at the first base portion and facing the first fixed electrode group in the second direction;
        a second coupling portion coupled to the other end of the support beam and extending from the support beam in the first direction;
        a second base portion coupled to the second coupling portion and provided along the second direction; and
        a second movable electrode group provided at the second base portion and facing the second fixed electrode group in the second direction,
    wherein hm=hr, where hm is a height of a gravity center position of the movable body in the third direction hr is a height of a rotation center of the support beam in the third direction, and
    hm1>hr>hm2, where hm1 is a height of a gravity center position of the first movable electrode group in the third direction and hm2 is a height of a gravity center position of the second movable electrode group in the third direction.

2. The physical quantity sensor according to claim 1, wherein
    the first movable electrode group and the second movable electrode group are arranged along the second direction between the first coupling portion and the second coupling portion.

3. The physical quantity sensor according to claim 1, wherein
    a thickness of the second movable electrode group in the third direction is larger than a thickness of the first movable electrode group in the third direction.

4. The physical quantity sensor according to claim 3, wherein
    a back surface position of the first movable electrode group in the third direction and a back surface position of the second movable electrode group in the third direction coincide with each other in an initial state.

5. The physical quantity sensor according to claim 1, wherein
    a thickness of the first movable electrode group in the third direction is equal to a thickness of the second movable electrode group in the third direction.

6. The physical quantity sensor according to claim 5, wherein
    a back surface position of the first movable electrode group in the third direction and a back surface position of the second movable electrode group in the third direction do not coincide with each other in an initial state.

7. The physical quantity sensor according to claim 1, wherein
    the support beam is a torsion spring that is twisted with the second direction as a rotation axis.

8. An inertial measurement unit comprising:
    the physical quantity sensor according to claim 1; and
    a control unit configured to perform control based on a detection signal output from the physical quantity sensor.

* * * * *